United States Patent
Grant et al.

(10) Patent No.: US 9,332,285 B1
(45) Date of Patent: May 3, 2016

(54) SWITCHING MODES OF A MEDIA CONTENT ITEM

(71) Applicant: Lucasfilm Entertainment Company Ltd., San Francisco, CA (US)

(72) Inventors: Andrew Grant, San Francisco, CA (US); Lutz Markus Latta, Mill Valley, CA (US); Ian Wakelin, Berkeley, CA (US); Darby Johnston, Berkeley, CA (US); John Gaeta, Ross, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

(21) Appl. No.: 14/724,578

(22) Filed: May 28, 2015

Related U.S. Application Data

(60) Provisional application No. 62/004,121, filed on May 28, 2014.

(51) Int. Cl.
| | |
|---|---|
| *G06F 13/00* | (2006.01) |
| *G06F 3/00* | (2006.01) |
| *H04N 5/445* | (2011.01) |
| *G09G 5/00* | (2006.01) |
| *H04N 21/2343* | (2011.01) |
| *G06F 17/30* | (2006.01) |
| *H04N 21/239* | (2011.01) |
| *H04N 21/472* | (2011.01) |
| *H04N 21/475* | (2011.01) |
| *H04N 21/41* | (2011.01) |
| *H04N 21/4402* | (2011.01) |
| *H04N 21/8545* | (2011.01) |

(52) U.S. Cl.
CPC .... *H04N 21/23439* (2013.01); *G06F 17/30864* (2013.01); *H04N 21/2393* (2013.01); *H04N 21/4122* (2013.01); *H04N 21/44029* (2013.01); *H04N 21/475* (2013.01); *H04N 21/47205* (2013.01); *H04N 21/47217* (2013.01); *H04N 21/8545* (2013.01)

(58) Field of Classification Search
CPC .................. H04N 21/23439; H04N 21/2393; H04N 21/4122; H04N 21/44029; H04N 21/47205; H04N 21/47217; H04N 21/475; G06F 17/30864
USPC .......................................... 725/37, 43, 52, 59
See application file for complete search history.

(56) References Cited

U.S. PATENT DOCUMENTS

| | | | | |
|---|---|---|---|---|
| 2014/0063054 | A1* | 3/2014 | Osterhout | G06F 3/005 345/633 |
| 2015/0234462 | A1* | 8/2015 | Miller | G06F 3/013 345/8 |
| 2015/0348327 | A1* | 12/2015 | Zalewski | G06F 3/01 345/419 |

OTHER PUBLICATIONS

Antonov, Michael, "Asynchronous Timewarp Examined," https://www.oculus.com/blog/asynchronous-timewarp/, Mar. 3, 2015.

*Primary Examiner* — Kyu Chae
(74) *Attorney, Agent, or Firm* — Kilpatrick Townsend & Stockton LLP

(57) ABSTRACT

Systems and techniques are provided for switching between different modes of a media content item. A media content item may include a movie that has different modes, such as a cinematic mode and an interactive mode. For example, a movie may be presented in a cinematic mode that does not allow certain user interactions with the movie. The movie may be switched to an interactive mode during any point of the movie, allowing a viewer to interact with various aspects of the movie. The movie may be displayed using different formats and resolutions depending on which mode the movie is being presented.

20 Claims, 16 Drawing Sheets

SWITCHING MODES OF A MEDIA CONTENT ITEM

CROSS-REFERENCE TO RELATED APPLICATIONS

This application claims the benefit of U.S. Provisional Application No. 62/004,121, filed May 28, 2014, entitled "Providing Immersive and Interactive User Experiences," which is hereby incorporated by reference, in its entirety.

FIELD

The present disclosure generally relates to providing an interactive media content experience to one or more users. For example, techniques and systems may be provided for switching modes of a media content item between cinematic and interactive modes.

BACKGROUND

Media content presentation is an ever-evolving industry that provides viewers with many options to enjoy the media content. For example, an item of media content may include a movie or television programming. In some instances, media content may be presented using a virtual reality system that immerses a viewer in a scene of the media content. To provide high quality media content in such a manner, media files for the media content often include large amounts of data that necessitate intensive storage and processing requirements.

SUMMARY

Techniques and systems are described for presenting media content. In one embodiment, techniques and systems are described for switching between different modes of a media content item. In particular, a media content item may include a movie that has different modes, such as a cinematic mode and an interactive mode. For example, a movie may be presented in a cinematic mode that does not allow certain user interactions with the movie. The movie may be switched to an interactive mode during any point of the movie, allowing a viewer to interact with various aspects of the movie. The movie may be displayed using different formats and resolutions depending on which mode the movie is being presented.

A cinematic mode of a media content item may include the media content item progressing along a predefined timeline over which multiple, simultaneous story threads progress. While the media content is in the cinematic mode, a viewer may passively watch a primary story thread of the media content item from a cinematic perspective. However, interaction with the media content item by the viewer is not enabled while in the cinematic mode. A switch may then be made to the interactive mode, during which the viewer can interact with the media content item. In some examples, the viewer may navigate through a virtual environment of the media content item by moving a virtual camera through the virtual environment. For example, the viewer may use one or more gestures to control a viewing perspective of one or more virtual cameras to change a perspective at which the media content item is viewed. In another example, the viewer may select a virtual object displayed in one or more images of the media content item, upon which a perspective of a virtual camera may attach to that object. From the point of selection forward, the viewing perspective of the viewer may be from the perspective of the virtual object. In other examples, while navigating through the virtual environment, the viewer may bookmark one or more locations within the environment to create one or more location bookmarks. The viewer may later select a location bookmark to return to a location that corresponds to the selected bookmark. For example, a viewing perspective of a virtual camera may be changed to the location that corresponds to the location bookmark. In some embodiments, the system may present the media content item using different formats and resolutions in the different modes.

Techniques and systems are also described for allowing a viewer to navigate a virtual environment of a media content item using a computing device. The computing device may include a mobile device, such as a mobile phone, a tablet, or other handheld device. A viewer may navigate a scene of a movie using one or more sensors of the computing device. The system may associate or map a position of a virtual camera at which the media content item is viewed to a physical position and/or orientation of the computing device. In some examples, the viewer may view the media content item on the computing device itself. In some examples, the viewer may view the media content item on a viewing device that is separate from the computing device, such as a television, a virtual reality head-mounted device, or other viewing device. Sensors may include an accelerometer, a gyroscope, a magnetometer, a depth sensor, a global positioning system sensor, or other appropriate sensor that can provide signals indicating position and/or orientation.

The systems and techniques described above may utilize a server to render the images of media content items. For example, the images may be rendered remotely by the server, and provided to a viewing device for presentation. Navigation inputs including positioning information (e.g., gesture input, sensor input, head orientation information, or other input) may be sent to the server to control which images are rendered and from which virtual camera viewing perspective the images are rendered. The server may include a cloud server of a cloud network. In some embodiments, a computing device (e.g., a mobile phone, a tablet, a head-mounted device, or other device) may send a signal with initial positioning information and an associated position indicator to the server. The server may use the initial positioning information to render images of the media content item from the perspective at which the user of the computing device is oriented or positioned. The server may send the rendered images back to the computing device with the associated position indicator. The computing device can use the position indicator to determine the initial positioning information at which the images are rendered. The computing device can then check updated positioning information of the computing device, and can use the received associated position indicator, the initial positioning information, and the updated positioning information to modify the rendered image to shift the perspective of the rendered image to that of the updated positioning information.

According to at least one example of switching between different modes of a media content item, a computer-implemented method may be provided that includes receiving, by the computing device while operating in a cinematic mode, a set of images of the media content item, the set of images having been rendered by a cloud server different from the computing device. The set of images include a predefined cinematic perspective of a virtual camera within a virtual environment of the media content item. The method further includes presenting, by the computing device while operating in the cinematic mode, the media content item in a first format and in a passive manner in which user control of the virtual camera within the virtual environment of the media content item is not enabled. The method further includes receiving, by the computing device, input corresponding to a user command to switch from operation in the cinematic mode to operation in an interactive mode. The method further includes switching, by the computing device, from operation in the cinematic mode to operation in the interactive mode in which user control of the virtual camera within the virtual environment of the media content item is enabled and the media content item is presented in a second format different from the first format. The method further includes receiving, by the computing device while operating in the interactive mode, input corresponding to a navigation command for controlling navigation of the virtual camera within the virtual environment. The input includes initial positioning information for the computing device. The method further includes associating the initial positioning information with a position indicator and storing the initial positioning information in association with the position indicator in a storage device. The method further includes transmitting a signal corresponding to the navigation command to the cloud server. The signal includes the initial positioning information and the position indicator. The method further includes receiving image data from the cloud server. The image data includes the position indicator and an image rendered by the cloud server corresponding to the initial positioning information. The method further includes determining updated positioning information for the computing device, and retrieving the initial positioning information from the storage device based on the position indicator. The method further includes modifying, by the computing device, the received image rendered by the cloud server based on the received position indicator, the retrieved initial positioning information, and the updated positioning information to generate an additional image corresponding to the updated positioning information. The method further includes presenting, by the computing device while operating in the interactive mode, the additional image corresponding to the updated positioning information.

In some embodiments, a computing device may be provided for switching modes associated with a media content item. The computing device includes an input device for receiving, while the computing device is operating in a cinematic mode, a set of images of the media content item, the set of images having been rendered by a cloud server different from the computing device. The set of images include a predefined cinematic perspective of a virtual camera within a virtual environment of the media content item. The computing device further includes one or more processors configurable to present, while the computing device is operating in the cinematic mode, the media content item in a first format and in a passive manner in which user control of the virtual camera within the virtual environment of the media content item is not enabled. The input device is configured to receive input corresponding to a user command to switch from operation in the cinematic mode to operation in an interactive mode, and the one or more processors are configurable to switch from operation in the cinematic mode to operation in the interactive mode in which user control of the virtual camera within the virtual environment of the media content item is enabled and the media content item is presented in a second format different from the first format. The input device is configured to receive, while the computing device is operating in the interactive mode, input corresponding to a navigation command for controlling navigation of the virtual camera within the virtual environment. The input includes initial positioning information for the computing device. The one or more processors are configurable to associate the initial positioning information with a position indicator and store the initial positioning information in association with the position indicator in a storage device. The computing device further includes an output device for transmitting a signal corresponding to the navigation command to the cloud server. The signal includes the initial positioning information and the position indicator. The input device is configured to receive image data from the cloud server. The image data includes the position indicator and an image rendered by the cloud server corresponding to the initial positioning information. The one or more processors are configurable to determine updated positioning information for the computing device, retrieve the initial positioning information from the storage device based on the position indicator, and modify the received image rendered by the cloud server based on the received position indicator, the retrieved initial positioning information, and the updated positioning information to generate an additional image corresponding to the updated positioning information. The one or more processors are further configurable to present, while the computing device is operating in the interactive mode, the additional image corresponding to the updated positioning information.

In some embodiments, a computer-readable memory storing a plurality of instructions executable by one or more processors may be provided. The plurality of instructions comprise: instructions that cause the one or more processors to receive, while the computing device is operating in a cinematic mode, a set of images of the media content item, the set of images having been rendered by a cloud server different from the computing device and including a predefined cinematic perspective of a virtual camera within a virtual environment of the media content item; instructions that cause the one or more processors to present, while the computing device is operating in the cinematic mode, the media content item in a first format and in a passive manner in which user control of the virtual camera within the virtual environment of the media content item is not enabled; instructions that cause the one or more processors to receive input corresponding to a user command to switch from operation in the cinematic mode to operation in an interactive mode; instructions that cause the one or more processors to switch from operation in the cinematic mode to operation in the interactive mode in which user control of the virtual camera within the virtual environment of the media content item is enabled and the media content item is presented in a second format different from the first format; instructions that cause the one or more processors to receive, while the computing device is operating in the interactive mode, input corresponding to a navigation command for controlling navigation of the virtual camera within the virtual environment, wherein the input includes initial positioning information for the computing device; instructions that cause the one or more processors to associate the initial positioning information with a position indicator; instructions that cause the one or more processors to store the initial positioning information in association with the position indicator in a storage device; instructions that cause the one or more processors to transmit a signal corresponding to the navigation command to the cloud server, the signal including the initial positioning information and the position indicator; instructions that cause the one or more processors to receive image data from the cloud server, the image data including the position indicator and an image rendered by the cloud server corresponding to the initial positioning information; instructions that cause the one or more processors to determine updated positioning information for the computing device; instructions that cause the one or more processors to retrieve the initial positioning information from the storage device based on the position indicator; instructions that cause the one or more processors to modify the received image rendered by the cloud server based on the received position indicator, the retrieved initial positioning information, and the updated positioning information to generate an additional image corresponding to the updated positioning information; and instructions that cause the one or more processors to present, while the computing device is operating in the interactive mode, the additional image corresponding to the updated positioning information.

In some embodiments, the position indicator includes a time stamp, a color, or a shape. In some embodiments, the method, system, and computer-readable memory described above may further include storing, in the storage device, a plurality of sets of positioning information in association with corresponding position indicators, each set of positioning information being associated with a separate position indicator in the storage device. The method, system, and computer-readable memory may further include identifying the position indicator in the received image data. Retrieving the initial positioning information from the storage device based on the position indicator may include identifying a set of positioning information from the plurality of sets that is stored in association with the initial positioning information in the storage device.

In some embodiments, the received image is modified to compensate for a difference in positioning information between the initial positioning information and the updated positioning information.

In some embodiments, the media content item is automatically paused at a first time of a timeline associated with the media content item when the computing device switches from operation in the cinematic mode to operation in the interactive mode.

In some embodiments, the interactive mode allows control of a timeline of the media content item.

In some embodiments, the method, system, and computer-readable memory described above may further include switching operation of the computing device from the interactive mode to the cinematic mode, wherein the virtual camera returns to the predefined cinematic perspective from a user controlled perspective when the computing device is switched from operation in the interactive mode to operation in the cinematic mode.

In some embodiments, the method, system, and computer-readable memory described above may further include receiving input corresponding to selection of a location bookmark, the location bookmark corresponding to a location within the virtual environment, transmitting a signal corresponding to the location bookmark to the cloud server, and receiving at least one image of the media content item from the cloud server, the at least one image including a perspective of the virtual camera at the location within the virtual environment based on the location bookmark. The method, system, and computer-readable memory may further include presenting the at least one image of the media content item.

In some embodiments, the method, system, and computer-readable memory described above may further include pausing the media content item when the computing device is switched from operation in the cinematic mode to operation in the interactive mode, receiving input corresponding to selection of an object within the virtual environment, transmitting a signal corresponding to the selection of the object to the cloud server, and receiving at least one image of the media content item from the cloud server, the at least one image including a perspective of the virtual camera from a point of view of the object. The method, system, and computer-readable memory may further include unpausing the media content item to present the at least one image of the media content item.

In some embodiments, selection of the object includes moving the virtual camera a threshold distance from the object.

According to at least one example of allowing a viewer to navigate a virtual environment of a media content item using a computing device, a computer-implemented method may be provided that includes receiving, by the computing device, a set of images of the virtual environment of the media content item, the set of images having been rendered by a cloud server different from the computing device. The method further includes presenting, by the computing device, the set of images of the virtual environment and receiving, by the computing device, a sensor input in response to movement of the computing device. The sensor input corresponding to a navigation command for controlling navigation of a virtual camera within the virtual environment. The sensor input is received from at least one of an accelerometer, a gyroscope, a depth sensor, or a global positioning system sensor of the computing device. The method further includes determining initial positioning information based on the sensor input, associating the initial positioning information with a position indicator, storing the initial positioning information in association with the position indicator in a storage device, and transmitting a signal corresponding to the navigation command to the cloud server. The signal includes the initial positioning information and the position indicator. The method further includes receiving image data from the cloud server. The image data includes the position indicator and an image rendered by the cloud server corresponding to the initial positioning information. The method further includes determining updated positioning information for the computing device, retrieving the initial positioning information from the storage device based on the position indicator, and modifying, by the computing device, the received image rendered by the cloud server based on the received position indicator, the retrieved initial positioning information, and the updated positioning information to generate an additional image corresponding to the updated positioning information. The method further includes presenting, by the computing device, the additional image corresponding to the updated positioning information.

In some embodiments, a computing device may be provided for navigating a virtual environment of a media content item. The computing device includes an input device for receiving a set of images of the virtual environment of the media content item, the set of images having been rendered by a cloud server different from the computing device. The computing device further includes one or more processors configurable to present the set of images of the virtual environment. The input device is configured to receive a sensor input in response to movement of the computing device. The sensor input corresponds to a navigation command for controlling navigation of a virtual camera within the virtual environment. The sensor input is received from at least one of an accelerometer, a gyroscope, a depth sensor, or a global positioning system sensor of the computing device. The one or more processors are configurable to determine initial positioning information based on the sensor input, associate the initial positioning information with a position indicator, and store the initial positioning information in association with the position indicator in a storage device. The computing device further includes an output device for transmitting a signal corresponding to the navigation command to the cloud server. The signal includes the initial positioning information and the position indicator. The input device is configured to receive image data from the cloud server. The image data includes the position indicator and an image rendered by the cloud server corresponding to the initial positioning information. The one or more processors are configurable to determine updated positioning information for the computing device, retrieve the initial positioning information from the storage device based on the position indicator, and modify the received image rendered by the cloud server based on the received position indicator, the retrieved initial positioning information, and the updated positioning information to generate an additional image corresponding to the updated positioning information. The one or more processors are further configurable to present the additional image corresponding to the updated positioning information.

In some embodiments, a computer-readable memory storing a plurality of instructions executable by one or more processors may be provided. The plurality of instructions comprise: instructions that cause the one or more processors to receiving a set of images of the virtual environment of the media content item, the set of images having been rendered by a cloud server different from the computing device; instructions that cause the one or more processors to present the set of images of the virtual environment; instructions that cause the one or more processors to receive a sensor input in response to movement of the computing device, the sensor input corresponding to a navigation command for controlling navigation of a virtual camera within the virtual environment, wherein the sensor input is received from at least one of an accelerometer, a gyroscope, a depth sensor, or a global positioning system sensor of the computing device; instructions that cause the one or more processors to determine initial positioning information based on the sensor input; instructions that cause the one or more processors to associate the initial positioning information with a position indicator; instructions that cause the one or more processors to store the initial positioning information in association with the position indicator in a storage device; instructions that cause the one or more processors to transmit a signal corresponding to the navigation command to the cloud server, the signal including the initial positioning information and the position indicator; instructions that cause the one or more processors to receive image data from the cloud server, the image data including the position indicator and an image rendered by the cloud server corresponding to the initial positioning information; instructions that cause the one or more processors to determine updated positioning information for the computing device; instructions that cause the one or more processors to retrieve the initial positioning information from the storage device based on the position indicator; instructions that cause the one or more processors to modify the received image rendered by the cloud server based on the received position indicator, the retrieved initial positioning information, and the updated positioning information to generate an additional image corresponding to the updated positioning information; and instructions that cause the one or more processors to presenting the additional image corresponding to the updated positioning information.

In some embodiments, the method, system, and computer-readable memory described above for navigating a virtual environment may further include storing, in the storage device, a plurality of sets of positioning information in association with corresponding position indicators. Each set of positioning information is associated with a separate position indicator in the storage device. The method, system, and computer-readable memory may further include identifying the position indicator in the received image data. Retrieving the initial positioning information from the storage device based on the position indicator may include identifying a set of positioning information from the plurality of sets that is stored in association with the initial positioning information in the storage device.

In some embodiments, the received image is modified to compensate for a difference in positioning information between the initial positioning information and the updated positioning information.

In some embodiments, a position of the virtual camera is mapped to a physical position and orientation of the computing device using the sensor input.

In some embodiments, the position indicator includes a time stamp, a color, or a shape.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF DRAWINGS

Illustrative embodiments of the present invention are described in detail below with reference to the following drawing figures.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Many devices and systems allow media content to be processed and output for consumption. Media content (e.g., videos, video games, or other media) includes large amounts of data that must be stored and processed to render for display. Furthermore, viewers of media content desire media with the utmost quality and with various interactive options, leading to an even larger amount of data. The amount of storage and processing required to render frames of media content is a heavy burden for consumer devices. Embodiments of the present disclosure include techniques and systems that provide various interactive experience options to viewers while allowing the content to be remotely rendered. A viewer of media content may also be referred to as a user. For example, a user of a computing device (or other device) may view media content on the computing device (or on the other device).

Figure 1:
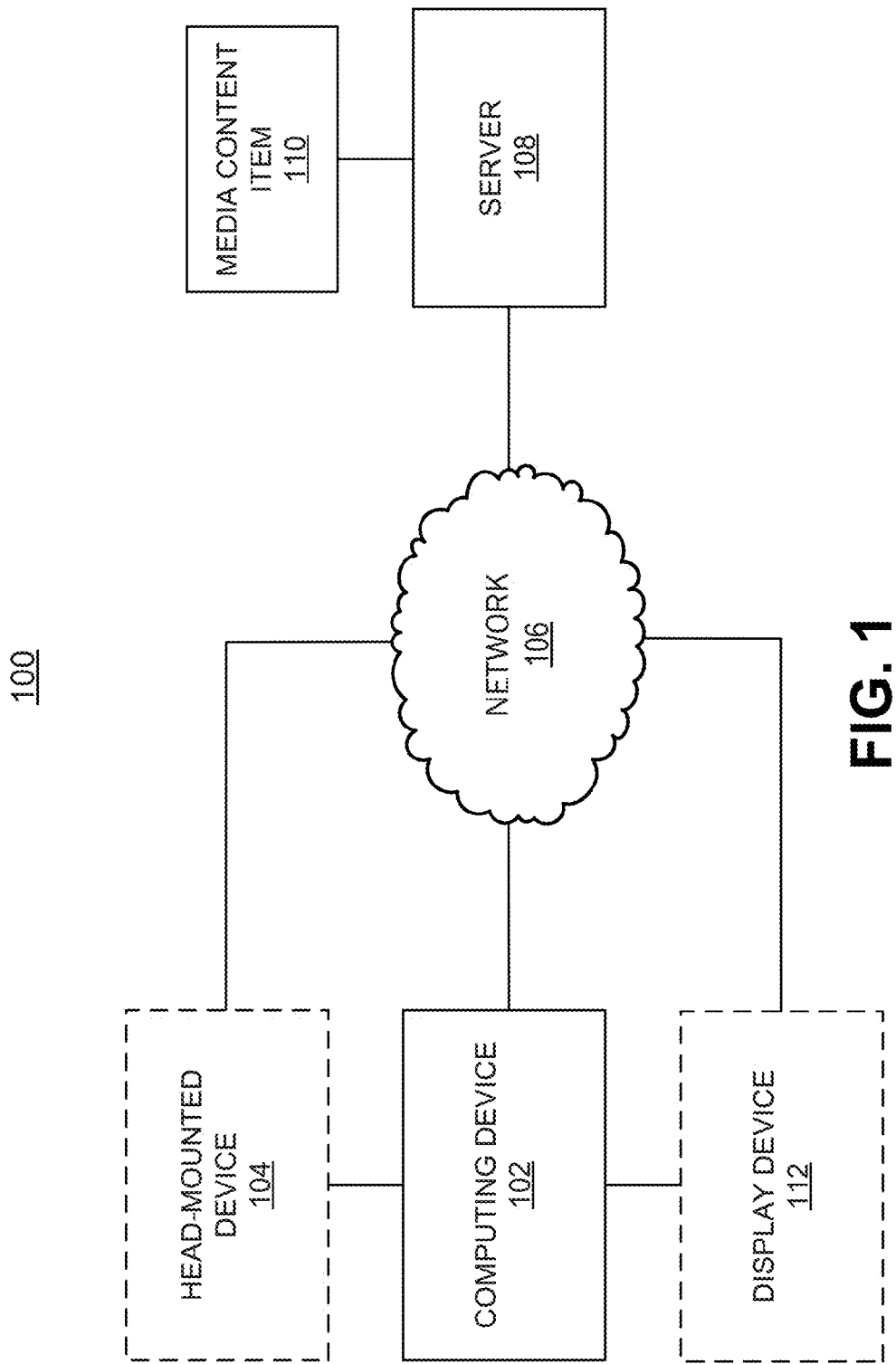
FIG. 1 is a block diagram illustrating an example of a system for remotely rendering images of a media content item at a server.

In some embodiments, an interactive content system can provide viewers with media content. For example, FIG. 1 illustrates an example of a system 100 that can remotely render images of a media content item 110. The system 100 may include a server 108 (e.g., one or more server computers) that is configured to and that may communicate with, provide content to, and/or control one or more interactive devices. The one or more interactive devices may include a computing device 102, a head-mounted device 104, a display device 112, or other suitable interactive device. Rendering the media content item 110 in the server 108 compensates for the limited computational power of interactive devices. While embodiments described herein describe the media content item 110 being rendered by the server 108, one of ordinary skill in the art will appreciate that, in some embodiments, the media content item 110 may be rendered in whole or in part by an interactive device. As described in more detail below, the media content item 110 may include interactive serial content (e.g., a movie, a television show, a video game, or the like) that can be presented in one or more modes. Contents of the media content item 110 may include various digital or virtual assets or objects (e.g., movie characters, virtual objects, or any other asset or object) as well as one or more backgrounds, such as a virtual environment depicting a representation of a physical environment.

The server 108 may include a cloud network computer that is part of a cloud network located remotely from the interactive devices. The cloud network may include one or more cloud infrastructure systems that provide cloud services. A cloud infrastructure system may, for example, be operated by a service provider. In some aspects, services provided by the cloud network may include a host of services that are made available to users of the cloud infrastructure system on demand, such as remote rendering of media content. Services provided by the cloud infrastructure system can dynamically scale to meet the needs of its users. The cloud network may comprise one or more computers, servers, and/or systems, including the server 108. In some embodiments, the computers, servers, and/or systems making up the cloud network are different from a customer's on-premises computers, servers, and/or systems. For example, the cloud network may host an application, and a user or customer may order and use the application via a communication network (e.g., network 106).

In some examples, the cloud network may host a Network Address Translation (NAT) Traversal application to establish a secure connection between a service provider of the cloud network and one or more of the interactive devices, such as computing device 102, head-mounted device 104, or display device 112. A separate secure Transmission Control Protocol (TCP) connection may be established by each interactive device for communicating between each interactive device and the server 108 (or other server) of the cloud network. In some embodiments, each secure connection may be kept open for an indefinite period of time so that the cloud network can initiate communications with each respective interactive device at any time. Various protocols may be used to establish a secure connection between each network device and the server 108, including Session Traversal Utilities for NAT (STUN), Traversal Using Relay NAT (TURN), Interactive Connectivity Establishment (ICE), a combination thereof, or any other appropriate NAT traversal protocol.

In some cases, communications between the cloud network and interactive devices may be supported using other types of communication protocols. Such protocols may include a Hypertext Transfer Protocol (HTTP) protocol, a Hypertext Transfer Protocol Secure (HTTPS) protocol, or other suitable communication protocol. In certain embodiments, the cloud network may include a suite of applications, middleware, and database service offerings that are delivered to a customer in a self-service, subscription-based, elastically scalable, reliable, highly available, and secure manner.

In some examples, an interactive device may include a computing device 102. The computing device 102 may include a mobile phone, a tablet device, a laptop computer, a television or other display device, a digital video recording device, a set-top box device, or any other suitable computing device. In some examples, an interactive device may include a head-mounted device 104. For example, the head-mounted device 104 may include a head-mounted virtual reality device, such as virtual reality goggles or glasses. In another example, the head-mounted device 104 may include three-dimensional glasses. In some examples, an interactive device may include a display device 112. For example, the display device 112 may include a television, a desktop or laptop computer, an immersion system or cave, or other suitable display device.

The server 108 may receive a request from an interactive device (e.g., computing device 102, head-mounted device 104, or display device 112) to load a media content item 110 onto the requesting interactive device or another interactive device. In some examples, as described in more detail below, the request may be sent by the same interactive device that will display the media content item 110. For example, the computing device 102 may display the media content item and may also allow a viewer or user to interact with the displayed media content item. In other examples, the request may be sent by a different interactive device than that which will display the media content item 110. For example, the computing device 102 may be used to interact with or control a media content item that is displayed on another interactive device, such as the head-mounted device 104 or the display device 112. Accordingly, the head-mounted device 104 and the display device 112 are optional in the system 100, as indicated by the dotted lines of the respective blocks displayed in FIG. 1. Various examples of system configurations with interactive devices are described below with respect to FIGS. 2, 3, 4, 5A, and 5B.

The request for the media content item 110 may be transmitted using a communications link over a network 106. The communications link may include a signal transmitted using the network 106, which may include a wireless network, a wired network, or a combination of a wired and wireless network. A wireless network may include any wireless interface or combination of wireless interfaces and may include any suitable wireless network (e.g., the Internet or other wide area network, a packet-based network, a WiFi™ network, a radio frequency (RF) network, an ultra-wideband (UWB) network, a WiFi-Direct network, a cellular network, a Long-Term Evolution (LTE) network, a WiMax™ network, or the like). A wired network may include any wired interface (e.g., fiber, ethernet, powerline ethernet, ethernet over coaxial cable, digital signal line (DSL), or the like). The wired and/or wireless networks making up the network 106 may be implemented using various equipment, such as one or more base stations, routers, access points, bridges, gateways, switches, or the like.

Upon receiving the request, the server 108 may provide the content to the interactive device (or another interactive device) by rendering the images of the media content item and sending the rendered images to the interactive device. The server 108 may include hardware and software implementing a rendering algorithm for rendering images of the media content item 110. The rendering algorithm may utilize one or more scene files that contain objects in a defined language or data structure. For example, the scene file may include a description of the virtual scene that includes geometries, viewpoints, textures, lighting, and shading information of different virtual environments, virtual backgrounds, and virtual objects in the scene. Any suitable rendering algorithm may be used to process the scene file to render the images of the media content item 110. In some examples, a rendering algorithm may use one or more of rasterization techniques, ray casting techniques, ray tracing techniques, radiosity techniques, or other suitable techniques for rendering an image. In one example, the rendering algorithm used by the server 108 may include rasterization with deferred shading and dynamic global illumination. In some embodiments, the server 108 may include a graphics processing unit (GPU) in addition to a central processing unit (CPU) for rendering the images of the media content item 110.

In some embodiments, the server 108 can stream the images of the media content item 110 as the images are rendered. In some embodiments, the computing device 202 can request certain portions of the media content item 110, in which case the server 108 may send only a portion of the media content item 110. Once the rendered images of the media content item 110 are received, the interactive device may present or display the images to a viewer. In some alternative embodiments, an interactive device may be provided with information usable by the interactive device to render the images of the content itself.

Figure 2:
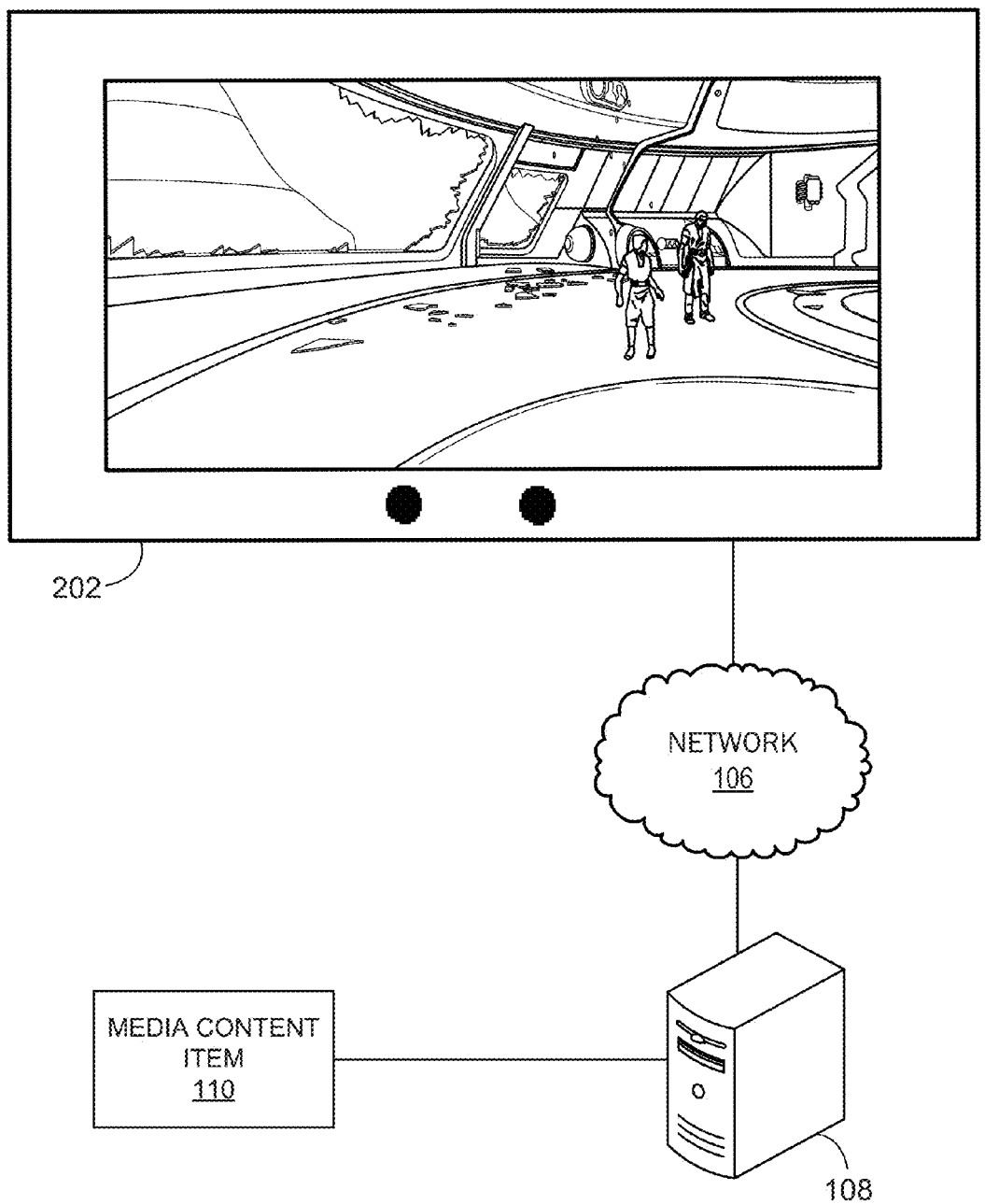
FIG. 2 illustrates an example of a system for presenting a media content item.

FIG. 2 illustrates one example of a system 200 for presenting the media content item 110. The computing device 202 can send a request over the network 106 to the server 108 requesting the media content item 110. Similar to the computing device 102, the computing device 202 may include mobile phone, a tablet device, a laptop computer, a television or other display device, a digital video recording device, a set-top box device, or any other suitable computing device. In some embodiments, the server 108 renders the images of the media content item 110 upon receiving the request. In other embodiments, the images of the media content item 110 may be rendered prior to receiving the request. In response to the request, the server 108 sends the rendered images of the media content item 110 to the computing device 202 over the network 106. The computing device 202 then receives the media content item 110 rendered by the server 108. Once one or more of the images of the media content item 110 are received, the computing device 202 can begin presenting the media content item 110.

In the example of FIG. 2, the computing device 202 also allows the viewer to interact with the displayed media content item 110. Using the system configuration of system 200, a request for a media content item 110 is sent by the same interactive device that displays the media content item 110 and that allows the viewer to interact with the media content item 110.

Figure 3:
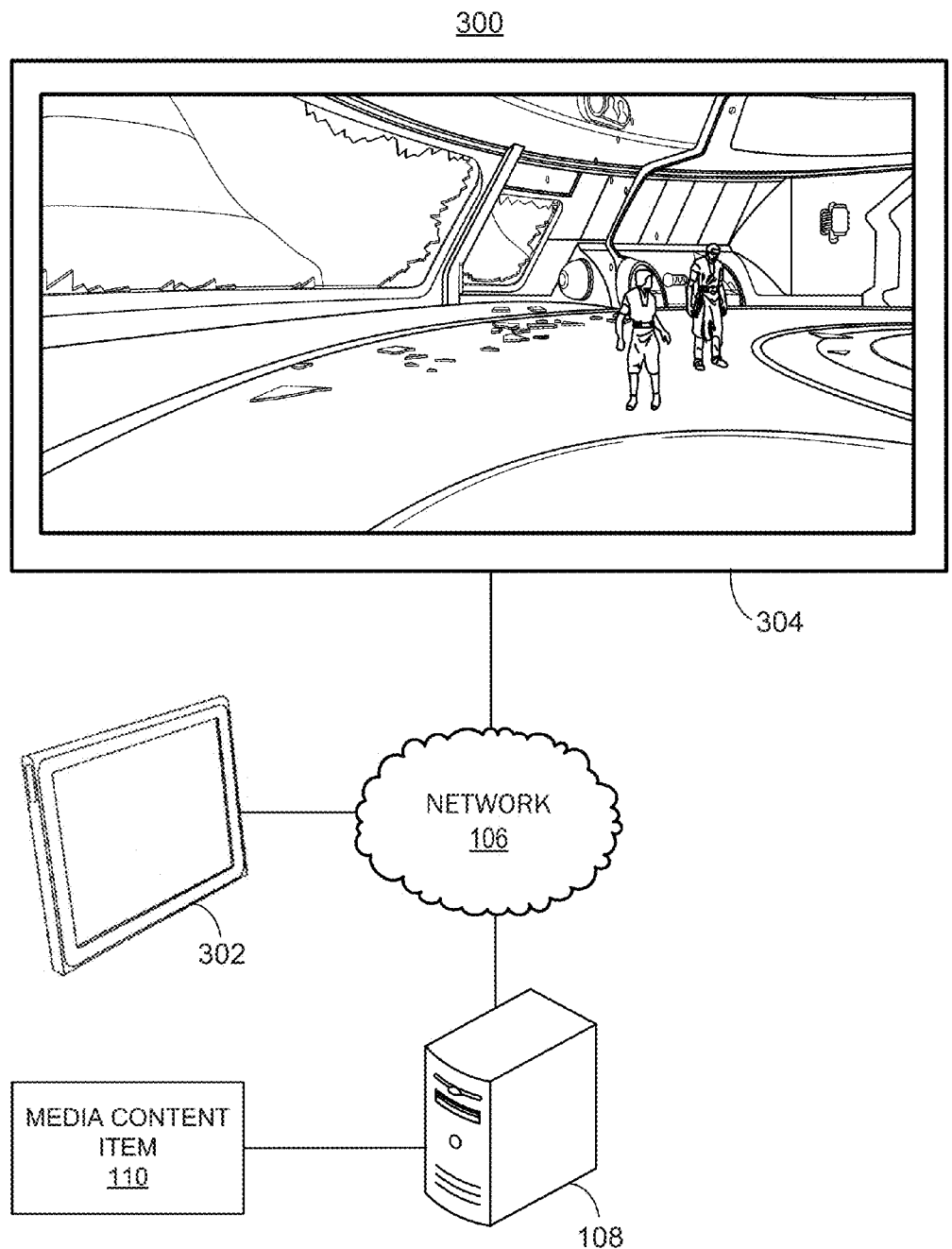
FIG. 3 illustrates another example of a system for presenting a media content item.

In other examples, requests for a media content item 110, and control of the media content item 110, may be implemented by a different interactive device than that which displays the media content item 110. For example, FIG. 3 shows another example of a system 300 for presenting the media content item 110. The system 300 includes a computing device 302 and a display device 304. The computing device 302 may include mobile phone, a tablet device, a laptop computer, a digital video recording device, a set-top box device, or any other suitable computing device. The display device 304 may include a television, a desktop or laptop computer, or other suitable display device.

The computing device 302 may be used to control the media content item 110, while the display device 304 may display the media content item 110. For example, the computing device 302 can be used to request the media content item 110 (or portions thereof) from the server 108 over the network 106. The server 108 may send rendered images of the media content item 110 to the display device 304 over the network 106. The computing device 302 can also be used to interact with the media content item 110. The computing device 302 may send commands to the server 108 over the network 106 in order to interact with the media content item 110, as described in more detail below. In some embodiments, both the computing device 302 and the display device 304 may be used to request or to interact with the media content item 110.

In some embodiments, a user of the computing device 302 may view the media content item 110 on the computing device 302. At a later point in time, the user may switch from viewing the media content item 110 on the computing device 302 to viewing the media content item 110 on the display device 304. For example, a player application executed on the computing device 302 may send a control signal to a player application executed on the display device 304. The control signal may instruct the player device of the display device 304 to begin presenting images of the media content item 110 rendered by the server 108. In some examples, the computing device 302 or the display device 304 may send a message to the server 108 instructing the server 108 to begin sending rendered images to the display device 304. In other examples, the computing device 302 may receive rendered images from the server 108. The computing device 302 may then send the rendered images to the display device 304. The computing device 302 can be used to control features of the media content item 110 presented by the display device 304.

Figure 4:
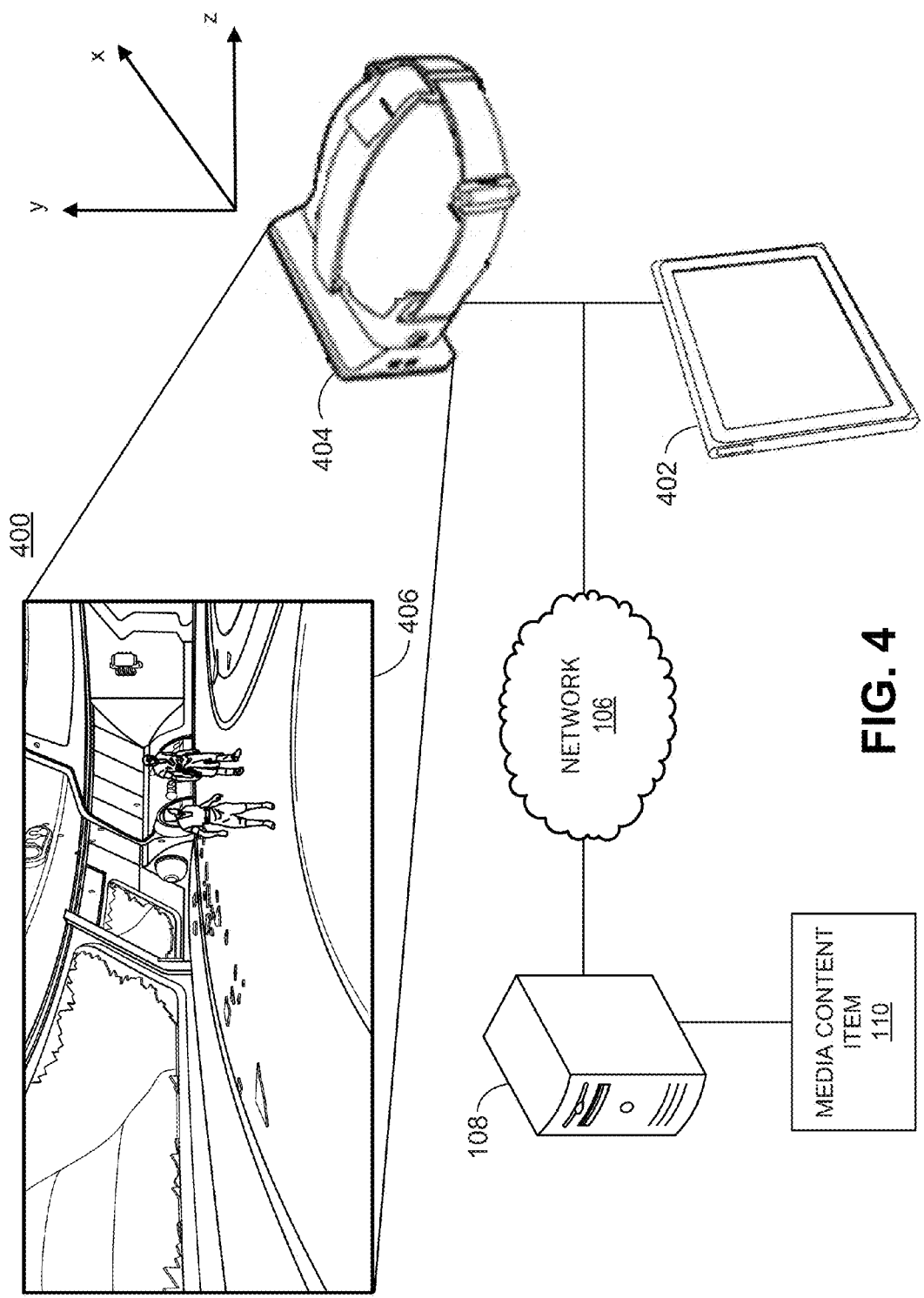
FIG. 4 illustrates another example of a system for presenting a media content item.

FIG. 4 shows yet another example of a system 400 for presenting the media content item 110. The system 400 includes a computing device 402 and a head-mounted device 404. The computing device 402 may include mobile phone, a tablet device, a laptop computer, a digital video recording device, a set-top box device, or any other suitable computing device. The head-mounted device 404 may include a head-mounted virtual reality device (e.g., virtual reality goggles or glasses), three-dimensional glasses, or other head-mounted device.

The computing device 402 may be used to control the media content item 110, and the head-mounted device 404 may display the media content item 110 (as depicted by view 406). For example, head-mounted virtual reality goggles may be used to convey a feeling that the viewer is immersed in a displayed environment. A viewer may operate the computing device 402 to request the media content item 110 (or portions thereof) from the server 108 over the network 106. The server 108 may send rendered images of the media content item 110 to the head-mounted device 404 over the network 106.

The computing device 402 can also be used to interact with the media content item 110 displayed using the head-mounted device 404. The computing device 402 may send commands to the server 108 over the network 106 in order to interact with the media content item 110, as described in more detail below. In some embodiments, both the computing device 402 and the head-mounted device 404 may be used to request or to interact with the media content item 110.

In some embodiments, a user of the computing device 402 may view the media content item 110 on the computing device 402. The user may switch from viewing the media content item 110 on the computing device 402 to viewing the media content item 110 on the head-mounted device 404. For example, a player application executed on the computing device 402 may send a control signal to a player application executed on the head-mounted device 404. The control signal may instruct the player device of the head-mounted device 404 to begin presenting images of the media content item 110 rendered by the server 108. In some examples, the computing device 402 or the head-mounted device 404 may send a message to the server 108 instructing the server 108 to begin sending rendered images to the head-mounted device 404. In other examples, the computing device 402 may receive rendered images from the server 108, and may send the rendered images to the head-mounted device 404. The computing device 402 can be used to control features of the media content item 110 presented by the head-mounted device 404.

Figure 5A:
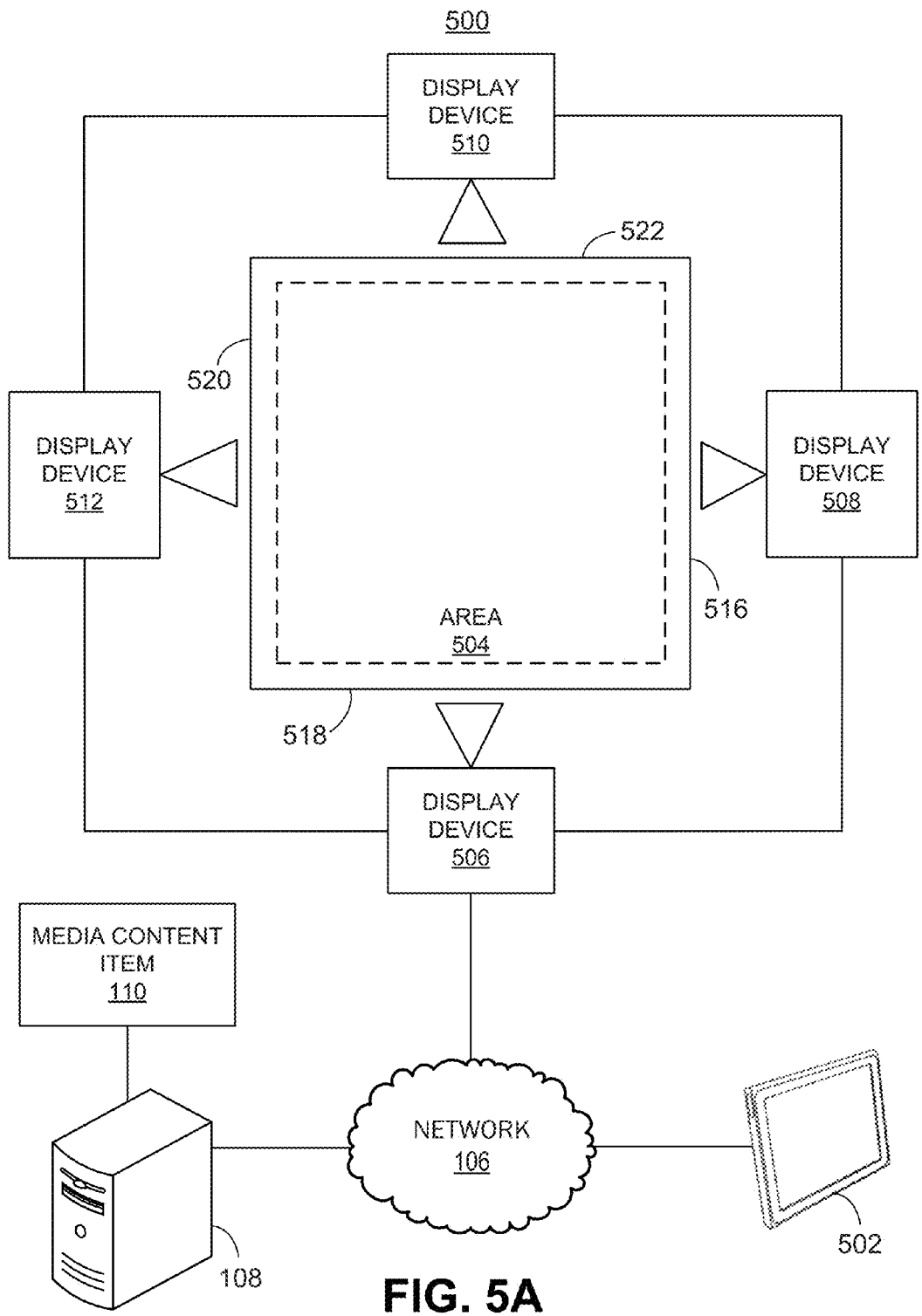
FIG. 5A and FIG. 5B illustrate another example of a system for presenting a media content item.
Figure 5B:
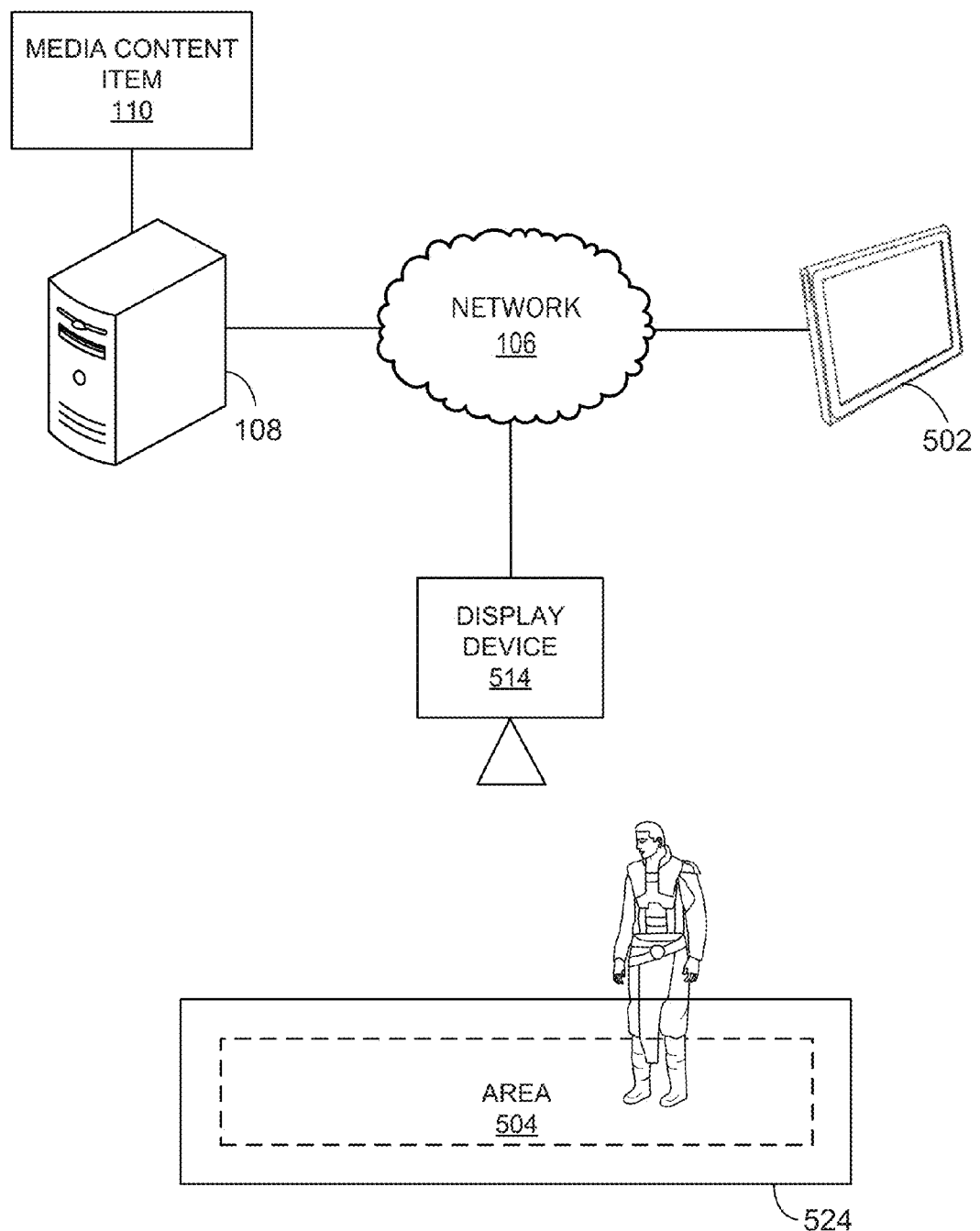

FIG. 5A and FIG. 5B illustrate another example of a system 500 for presenting the media content item 110. The system 500 may be referred to as an immersion system. The system 500 includes a computing device 502 and a server 108 that can communicate and/or control one or more display devices 506, 508, 510, 512, 514. The display devices 506, 508, 510, 512, 514 may be configured to and may project one or more images of the media content item 110. In one aspect, the display devices 506, 508, 510, 512, 514 may partially or wholly surround an area 504. While five display devices are shown in FIG. 5A and FIG. 5B, one of ordinary skill in the art will appreciate that the system 500 may include more or fewer display devices. For example, a group of display devices may span each wall of the area 504 to completely surround the area 504 and any persons located within the area 504. As another example, a group of display devices may partially surround the area 504 by creating two walls around the area 504. As still another example, a group of display devices may partially surround the area 504 by creating three walls around the area 504. In some embodiments, a group of display devices may additionally be configured to span a floor of the area 504. In one aspect, the display devices may also generate three-dimensional images (e.g., holograms) of assets, objects, or backgrounds of the media content item 110 such that a viewer is able to perceive depth in the assets, objects, or backgrounds.

In some examples, the system 500 may include a set of projector screens 516, 518, 520, 522, 524 that partially or fully surround the area 504 (e.g., create one or more walls surrounding the area 504). Each of the set of projector screens may be associated with one or more display devices positioned behind the screens to generate images on the screens. For example, display device 506 may project images onto screen 518, display device 508 may project images onto screen 516, display device 510 may project images onto screen 522, display device 512 may project images onto screen 520, and display device 514 may project images onto screen 524. The screen 524 may be placed on the floor of the area 504. The display device 514 may be positioned above or overhead of the area 504 so that images generated by the display device 514 can be projected onto the screen 524 positioned on the floor of the area 504. While FIG. and FIG. 5B illustratively show five screens and their respective display devices surrounding an area 504, one of ordinary skill in the art will appreciate that other configurations may be implemented.

In one aspect, images of the media content item 110 presented by the display devices 506, 508, 510, 512, 514 may be generated in real or substantially real-time by the server 108. The images may be presented in a stereo format such that a user wearing three-dimensional glasses (e.g., three-dimensional (3D) shutter glasses) may perceive three-dimensional assets or holograms from the images.

The system may further include one or more sensors located in the area 504. The sensors may include, for example, cameras, depth sensors, infra-red sensors, light sensors, or other suitable sensors. Such sensors may be used to track the movement and positioning of a user within the area 504 surrounded by the display devices 506, 508, 510, 512, 514 or of others outside of the area 504.

In some examples, the system 500 may establish a communication link with one or more interactive devices, such as the computing device 502, in proximity to the system 500. For example, the system may establish a Bluetooth™ link, a Zigbee™ link, or other communication link with the computing device 502 located within the area 504. Following establishment of the communication link, the system 500 may receive a selection of a particular item of content to present to the user of the computing device 102. The content may be, for example, the media content item 110 or other item of content.

Upon receiving the selection, the server 108 may retrieve information regarding the media content item 110 and may render the images of the media content item 110. The server 108 may send the images of the media content item 110 to the display devices 506, 508, 510, 512, 514. In some embodiments, each display device 506, 508, 510, 512, 514 may be assigned to generate a particular portion of the media content item 110 (e.g., certain assets, objects, and/or environments associated with the content). In some embodiments, the computing device 502 may provide height information for a particular user. Using the height information, the server 108 may adjust the height of assets or objects rendered in images of the media content item 110. For example, if a particular user were 6'5, the server 108 may adjust a particular character in a movie to also be 6'5. In one aspect, assets may be downloaded from the interactive device, from local storage of the system, or from a repository available over the Internet.

The system 500 may be used in several different applications. For example, an actor may use the immersive experience provided by the system 500 to aid in his or her acting performance (e.g., maintain eye level with a digital character). As another example, the immersive experience may be used by a movie viewer to be immersed within a customized movie based on the movie viewer's personal preferences using, for example, one or more of the interactive options described below. Illustratively, the user may prefer that a particular movie occur within a beach environment as opposed to a mountainous environment. As yet another example, a video game user may control a 3D holographic character within an immersive environment and interact with other assets in the immersive environment.

As described in more detail below with respect to FIG. 9 and FIG. 10, a computing device (e.g., computing device 102, 202, 302, 402, or 502), a head-mounted device (e.g., head-mounted device 104 or 404), or the computing device and head-mounted device working in conjunction may detect positioning information corresponding to a position and/or orientation of the viewer at a given point in time while watching the media content item 110. The positioning information may be used to control aspects of the media content item 110.

The media content item 110 can be presented and controlled using any of the configurations shown in FIG. 1-FIG. 5B. As previously described, the media content item 110 may include interactive serial content, such as a movie, a television show, a video game, or the like. The media content item 110 may also be presented using different modes. The different modes may include a cinematic mode and an interactive mode. The cinematic mode includes serially presenting the media content item 110 and does not allow user interaction with the media content item 110. The media content item 110 may be switched to an interactive mode during any point of the media content item 110. While in the interactive mode, a viewer or user can interact with various aspects of the media content item 110.

A computing device (e.g., computing device 102, 202, 302, 402, or 502) can operate in a cinematic and an interactive mode to switch the media content item 110 between the different modes. The media content item 110 contains information for the different modes, and a video player application being executed by the computing device switches between operation in interactive mode and cinematic mode. The media content item 110 may include a computer file containing camera information for the cinematic mode and also scene data necessary to produce the images of the interactive mode. For example, the computer file comprising the media content item 110 contains scene data (e.g., three-dimensional scene data) that is to be rendered into images viewable by the viewer or user. The images may be two-dimensional images or, in some embodiments, may be three-dimensional images. The computer file further includes a specific track (which may be referred to as a "director track") specifying predefined virtual camera positions that make up the cinematic mode of the media content item 110. A video player application installed on the computing device can load the computer file for playback to the viewer or user. When the video player application is operating in the cinematic mode, the video player application sends one or more signals to a rendering engine (e.g., a cloud-based rendering engine of the server 108, such as the rendering engine 1004 described below) instructing the rendering engine to render the media content item 110 using the director track. When the video player application receives input instructing it to operate in the interactive mode, the video player application allows the user to control the position of an interactive virtual camera. A user may provide input to move the virtual camera to one or more camera positions and/or orientations. When the input is received from the user, the video player application generates control information corresponding to the one or more camera positions and/or orientations. The video player application then sends signals with the control information to the rendering engine. In one example, the video player application may send control information with the physical position and orientation of the computing device to the server. In another example, the video player application may receive gesture input, and may determine a position and orientation based on the gesture input. The computing device may then send control information with the determined position and orientation to the server. The rendering engine can use the control information to render scenes from the camera positions and/or orientations based on the control information rather than the director track. For example, the rendering engine may map the physical position and orientation to the virtual camera position and orientation. The rendered scenes can be sent to the computing device (and/or to a head-mounted device or display device).

In some aspects, the media content item 110 includes a timeline over which multiple, simultaneous story threads progress. A story thread, as used herein, may refer to logical groups of scripted interactions between virtual objects, where each group of scripted interactions is associated with predefined virtual camera orientations or perspectives (which may be referred to as one or more cinematic perspectives). In some embodiments, the media content item 110 may further include two-dimensional (2D) and/or three-dimensional (3D) virtual scenes in which the story threads occur. The 2D and 3D virtual scenes are usable for rendering video in real-time at interactive frame rates for presentation to viewers.

Figure 6:
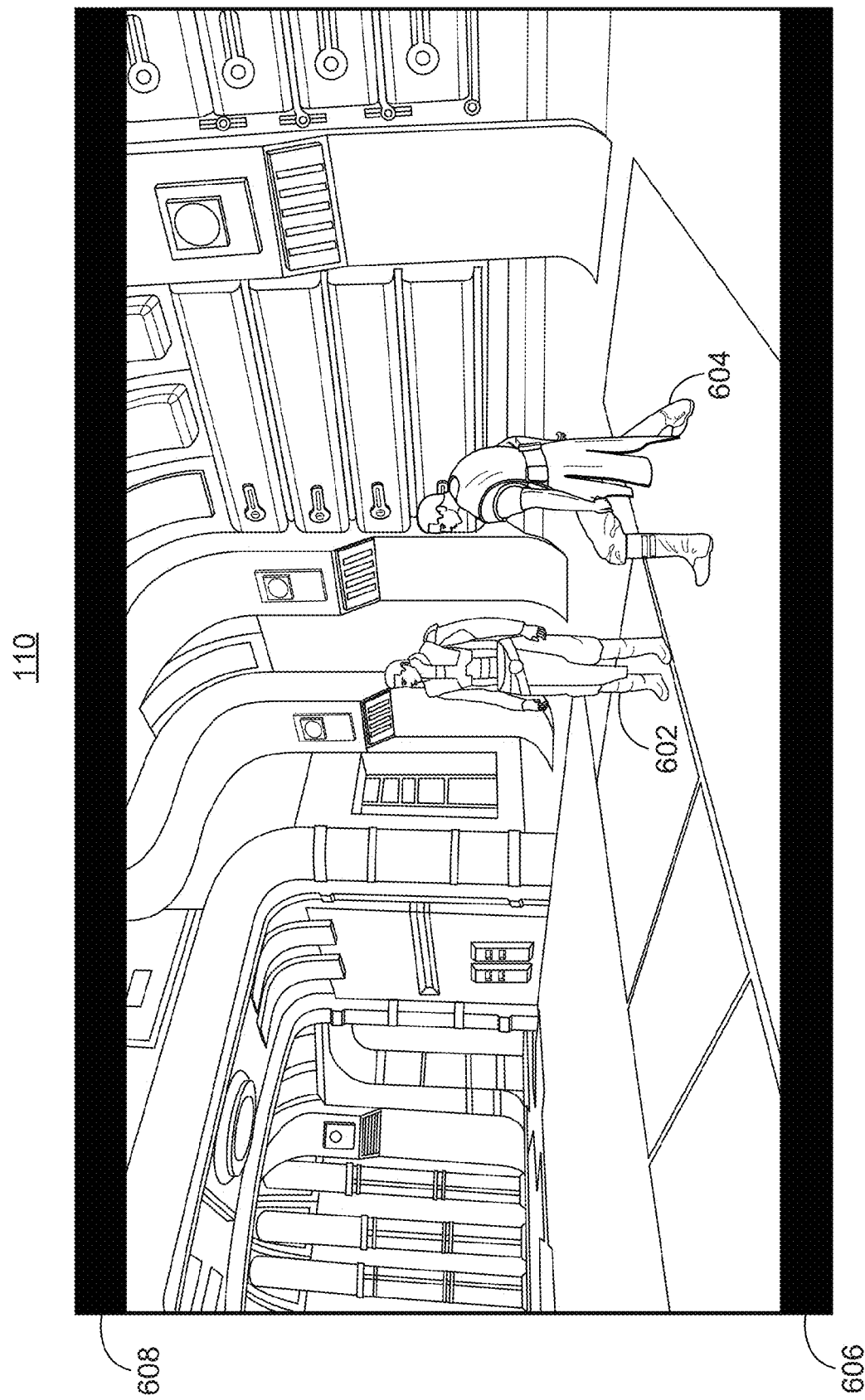
FIG. 6 illustrates an example of a media content item presented in a cinematic mode.

During initial presentation to a viewer, the media content item 110 may be presented in the cinematic mode. FIG. 6 illustrates an example of the media content item 110 presented in cinematic mode. When presented in cinematic mode, a pre-selected primary story thread for the media content item 110 is presented by rendering the 2D and/or 3D virtual scenes from a perspective of a virtual camera at the various predefined virtual camera orientations for the primary story thread. During this initial presentation, the primary story thread is presented in a cinematic, non-interactive mode. Thus, the viewer has no control over the perspectives from which the content is presented or over displayed assets or objects, such as characters 602 and 604. In some embodiments, the media content item 110 is presented in a default format and resolution while in the cinematic mode. As the primary story thread progresses along the timeline, the server 108 keeps track of and processes multiple non-primary story threads simultaneously over the timeline. The non-primary story threads are non-viewable by the viewer when the media content item 110 is in the cinematic mode.

Figure 7:
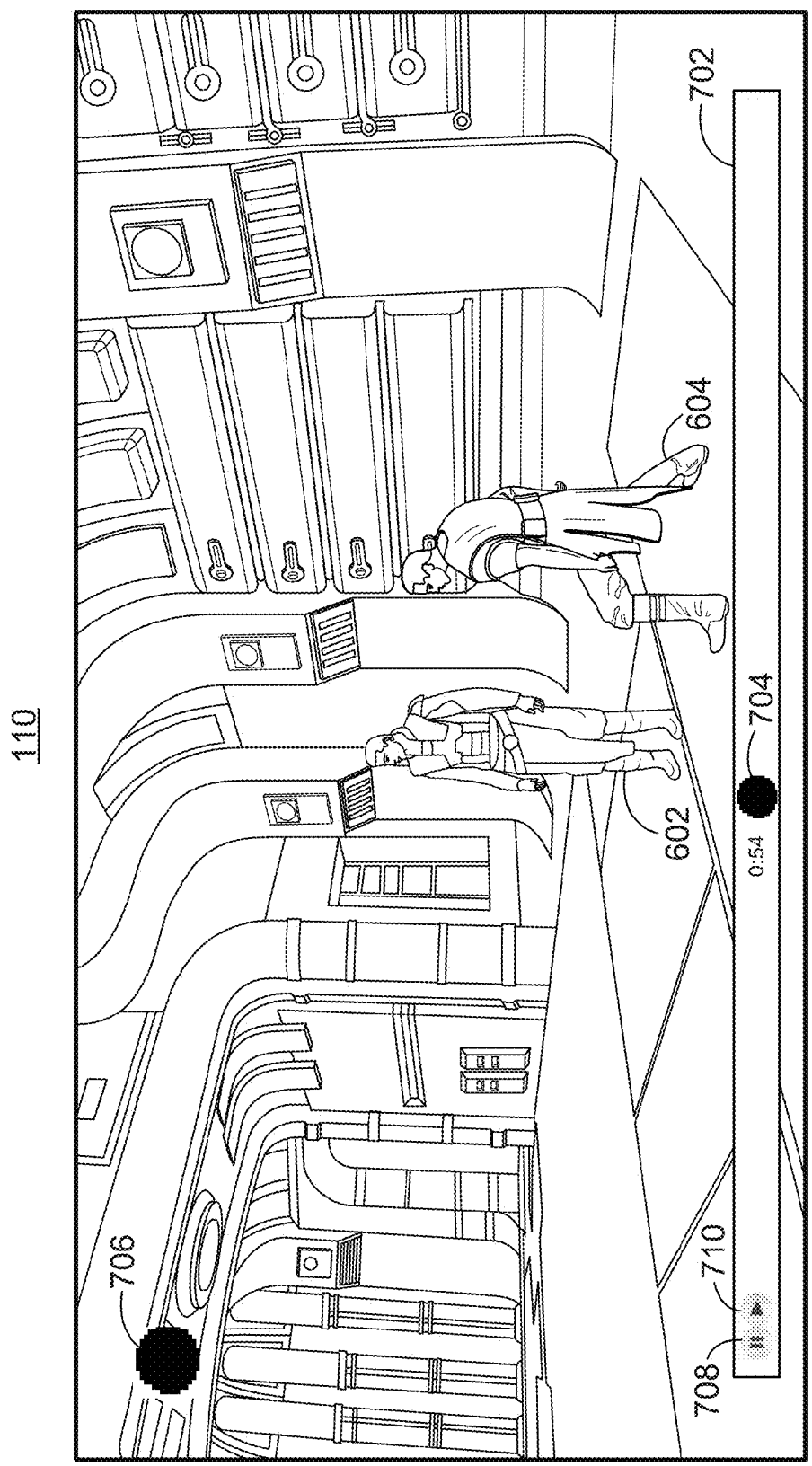
FIG. 7 illustrates an example of a media content item presented in an interactive mode.

At any point during the initial presentation, the viewer may specify that he or she wishes to interact with the media content item 110 using, for example, the computing device 102. In response, the server 108 switches the media content item 110 to an interactive mode for presentation. FIG. 7 illustrates an example of the media content item 110 presented in interactive mode. In some instances, the server 108 may render the images of the media content item 110 using a different format and resolution from the default format and resolution used for the cinematic mode. For example, the media content item 110 may be presented using a different (e.g., higher or lower) frame rate, resolution, aspect ratio, or other format when in the cinematic mode than when in the interactive mode. In one illustrative example, the media content item 110 may be played back in the cinematic mode at 24 frames per second, and can be played back in the interactive mode at 60 frames per second. In some examples of using different formats for the cinematic and interactive modes, the server 108 may render images without the letterbox bars 606 and 608 when the media content item 110 is presented by the computing device 102 in the interactive mode. For example, in cinematic mode, the top and bottom of the image can be masked (e.g., using a crop mask) to give the media content item 110 the appearance of a widescreen movie, but in the interactive mode the masking may not be used.

In some instances, when switching from cinematic to interactive mode, the server 108 may automatically pause or stop the progression of the story threads over the timeline. The viewer may cause the media content item 110 to continue over the timeline by selecting the play icon 710. In some instances, the media content item 110 may continue to progress along the timeline when switched from cinematic to interactive mode. The viewer may later pause the media content item 110 by selecting a pause icon 708. The viewer may interact with assets or objects and with the environment while the media content item 110 is paused or while the media content item 110 progresses along the timeline. In some embodiments, images of the media content item 110 (while in interactive mode) may display a timeline bar 702 representing the timeline. The viewer may progress a timing control icon 704 along the timeline to move to certain scenes along the timeline of the media content item 110.

While the media content item 110 is paused or progressing along the timeline, the viewer may navigate through a virtual environment of the media content item 110 by moving a virtual camera through the virtual environment. The viewer may change the perspective of the virtual camera to modify the perspective at which the media content item is presented. By allowing a viewer to manipulate the virtual camera perspective, the system 100 can simulate the viewer navigating through the virtual environment. In some examples, the viewer may discover other story threads of the media content item 110 other than the primary story thread that progresses along the timeline in the cinematic mode. For example, the viewer may discover one or more of the multiple non-primary story threads that are non-viewable when the media content item 110 is in the cinematic mode. The viewer may discover the previously hidden story threads by moving the virtual camera so that certain assets or objects associated with the hidden story threads are viewable from the virtual camera. Any discovered story threads may be added to a list of story threads for later access for viewing. Location bookmarks associated with the discovered story threads may also be placed on a scene map with location bookmarks (discussed below).

In some examples, the viewer may perform certain gestures using the computing device 102 to change the perspective of the virtual camera. The gestures may be performed using an interface of the computing device 102, for example using a touchscreen, a touchpad, a gesture-recognition device (e.g., a camera, depth sensor, or other device), or other interface. A gesture input may be interpreted as a navigation command to modify the virtual camera perspective. The gestures may be sent by computing device 102 to the server 108 over the network 106. The server 108 can then render new or updated images of the media content item 110 to change the virtual camera perspective based on the navigation commands that correspond to the received gestures. Any number of gestures may be used to change the perspective of the virtual camera. For example, a viewer may move a single finger up and down to cause the virtual camera perspective to angle up (e.g., to view a ceiling in a building) and to cause the virtual camera perspective to angle down (e.g., to view a floor in a building), respectively. As another example of a gesture, the viewer may move two fingers in any direction to cause the virtual camera perspective to crane in the respective direction without angling the virtual camera perspective. As yet another example of a gesture, the viewer may perform a pinching gesture, in which case a pinch of two fingers together may cause the virtual camera perspective to move forward in space and a spreading of two fingers apart may cause the virtual camera perspective to move backwards in space. One of ordinary skill in the art will appreciate that any other gesture or combination of gestures may be used to manipulate a viewing perspective of a virtual camera within the environment of the media content item 110.

In some examples, the viewer may access a scene map with location bookmarks. For example, while navigating through the virtual environment (e.g., using gestures to change the virtual camera perspective), the viewer may bookmark one or more locations within the environment to create one or more location bookmarks. The viewer may, for example, select a bookmark icon 706 in order to bookmark the location that the viewer is viewing when the bookmark icon 706 is selected. The viewer may later select a location bookmark (e.g., from a displayed list of location bookmarks) to return to a location that corresponds to the selected bookmark. When a location bookmark is selected, a viewing perspective of the virtual camera may be changed to the location that corresponds to the location bookmark.

In some examples, the viewer may move the virtual camera by moving the computing device 102. In such examples, the computing device 102 may be a handheld device that includes one or more physical sensors. The viewer may view the media content item 110 on the computing device 102 (as shown in FIG. 2), or on a separate device (as shown in any of the examples of FIG. 3-FIG. 5B). Physical sensors of the computing device 102 may include an accelerometer, a gyroscope, a magnetometer, a depth sensor, a global positioning system (GPS) sensor, or other appropriate sensor that can provide signals indicating position and/or orientation. Sensor input from one or more of the sensors may be used to determine a position and/or orientation of the virtual camera. A sensor input may be interpreted as a navigation command to modify the virtual camera perspective. The sensor input may be sent by computing device 102 to the server 108 over the network 106. The server 108 can then manipulate the images to change the virtual camera perspective based on the navigation commands that correspond to the received sensor input. In one embodiment, as images of the media content item 110 are being presented, the sever 108 may adjust the perspective of the virtual camera in the images based on a navigation command corresponding to the location and movement of the computing device 502. For example, if the computing device 502 (by virtue of the movement of its user) faces or moves towards a certain direction (as indicated by global positioning system (GPS) sensor, accelerometer, gyroscope, a magnetometer, or other sensor information from the computing device 502), a viewpoint of the virtual environment in a scene of the media content item 110 may change accordingly.

In some embodiments, the server 108 may associate or map a position of the virtual camera with a physical position and/or orientation of the computing device 102, as determined using the sensor input. For example, when a user causes the computing device 102 and the media content item 110 to switch to the interactive mode, movement of the computing device 102 in the physical world is mapped to movement through the virtual environment of the media content item 110. In some examples, the computing device 102 sends its physical position and orientation to the server 108, and the server 108 maps the physical position and orientation to the virtual camera position and orientation. In one example, a physical position and orientation of the computing device 102 at a first point in time is treated as the origin. As the simulated movement through the virtual environment continues in time, differences in position and/or orientation between the origin position and orientation at the first point in time and later positions and/or orientations are used to translate and rotate the virtual camera. In one embodiment, a physical camera of the computing device 102 may capture an image of a stationary, physical object that is directly ahead of the computing device 102. The computing device 102 may map the image of the physical object with a true north direction of the virtual environment. Thereafter, depending on where the physical object appears in subsequent images, the position of the virtual camera may be moved. For example, if in a subsequent image, the physical object appears on the right side of the image (rather than in the middle of the image when used for mapping), then the virtual camera may be moved accordingly in the westward direction in the virtual environment. In another embodiment, a depth sensor of the computing device 102 may detect the depths of surfaces (e.g., a wall) and/or other objects in the vicinity of the computing device 102. The computing device 102 may map the detected depths of the surfaces and/or objects with particular directions of the virtual environment. Thereafter, depending on how the later detected depths of the surfaces and/or objects change, the position of the virtual camera may be moved in certain directions within the virtual environment. For instance, if a physical wall associated with a north direction in the virtual environment is detected to have a shallower depth than in the past relative to the computing device 102 in subsequent depth sensor readings, then the position of the virtual camera may be moved to the north in the virtual environment. Such a movement may be performed since the shallower depth of the wall indicates that the computing device 102 has moved closer to the wall. The distance that the virtual camera may be moved in the virtual environment may be based on the physical change in depth of the wall relative to the computing device 102.

In some instances, the server 108 may perform a direct association between the virtual camera and the current physical position and/or orientation of the computing device 102. In such instances, even if the computing device 102 is physically facing down and the virtual camera is facing up in the virtual environment or scene of the media content item 110, the mapping would be maintained. In other instances, the server 108 may perform an association between the virtual camera and the current physical position and/or orientation of the computing device 102 based on the virtual scene and the physical environment in which the viewer is located. Thus, if the computing device 102 is facing upwards in the physical world, the virtual camera may also face upwards in the virtual scene. In one example, a scene of the media content item 110 may display a straight ahead virtual camera perspective. The viewer may rotate the computing device 102 to the left, causing one or more of the physical sensors to produce a sensor input that can be sent to the server 108 using one or more signals. As a result, the server 108 may present images of the media content item 110 with the virtual camera rotating to the left and stopping at a perspective showing the left side of an environment of the scene. While the viewer rotates the computing device 102, the media content item 110 may continue to be presented serially or, if paused, may remain paused.

In one aspect, based on the movement of the computing device 102, as detected by the physical sensors of the computing device 102, the virtual camera may be moved in the virtual environment. For instance, the server 108 may receive one or more signals corresponding to one or more sensor inputs, and may identify changes in camera images, depth information readings, gyroscope readings, accelerometer readings, magnetometer readings, GPS readings, or other sensor readings, to determine movement of the computing device 102. For example, a depth sensor of the computing device 102 may generate a depth sensor input with depth sensor information indicating a depth of a particular object located in the viewer's physical environment is a certain distance from the computing device 102. The computing device 102 may send a signal corresponding to the depth sensor input to the server 108. The depth information may indicate that the particular object in the physical environment is now closer in distance relative to the computing device 102 relative to a prior depth sensor input reading. Based on the updated depth sensor input reading, the server 108 may determine that the computing device 102 has moved forward three feet. The server 108 may then move the position of the virtual camera in the virtual environment or scene of the media content item 110 an equivalent of three feet in the virtual environment. In this way, a viewer may navigate through the virtual environment by moving and/or orientating his or her handheld device.

In some embodiments, as the virtual camera is adjusted to different locations and orientations in the environment of the media content item 110, the sound occurring in the media content item 110 may also be adjusted. For example, an explosion may occur in front of a given camera perspective. As the viewer rotates his or her tablet to the left, the sound of the explosion may be shifted such that the viewer perceives that the explosion is to his or her right side.

In embodiments involving the immersive system 500 of FIG. 5A and FIG. 5B, sensors located in or surrounding the area 504 may track the location and movement of a user of the system 500. For example, the sensors may track one or more markers affixed or included on 3D glasses, clothing, or other items worn by the user to determine location and movement of the user around the area 504. The markers may be of a particular shape and color, such as circular, spherical, square, white, yellow, green, or other suitable shape or color. Using the tracked markers to determine location and movement of the user, the server 108 may adjust the virtual camera perspective, and also may adjust assets or characters presented in images of the media content item 110. Adjustment of the virtual camera to track the movement of the user may enable the user to perceive that he or she is moving relative to assets and/or the environment of the media content item 110. In this way, the content displayed to the user can appear to be occurring in the real world. In one aspect, the system 500 may include one or more speakers presenting audio. In one aspect, the audio presented by the system may be adjusted based on the user's location and movement. In instances in which the immersive system 50 is used to capture actor performances, a green screen or some other matte may be presented by the display devices in a portion of a display behind the user. The green screen may move according to the location and movement of the user and/or the location and movement of a physical camera (which may have a communications link with the server 108) capturing the performance of the user.

In some embodiments, the viewer may use the computing device 102 to cause the virtual camera to be attached or stuck to certain objects in the virtual environment. For example, the viewer may use the computing device 102 to select a virtual object located in the virtual environment, upon which a perspective of a virtual camera may attach to that object. In one example, the viewer may attach the virtual camera to the virtual object by moving the virtual camera (using the computing device 102) a certain threshold distance from the object in the virtual environment. The threshold distance may be any suitable distance, such as an inch, two inches, six inches, a foot, or any other suitable distance. The viewer may move the virtual camera by inputting one or more gestures into an interface of the computing device 102, or by physically moving the computing device 102 (in which case position and/or orientation may be detected using physical sensors), as described in the examples above. In another example, the viewer may select the virtual object (e.g., by inputting a gesture or other input to an interface of the computing device 102) to attach the virtual camera to the virtual object.

As a result of attaching the virtual camera to the virtual object, the viewing perspective of the virtual camera may be modified to the perspective of the virtual object. In some cases, the virtual camera may follow the virtual object from a particular pre-defined distance and orientation. For example, the virtual camera may appear as if it is hovering above the virtual object at the pre-defined distance and orientation. In some cases, the virtual camera may be from a first person perspective of the virtual object. For example, the virtual camera may appear as if it is looking through the eyes of the virtual object.

Figure 8:
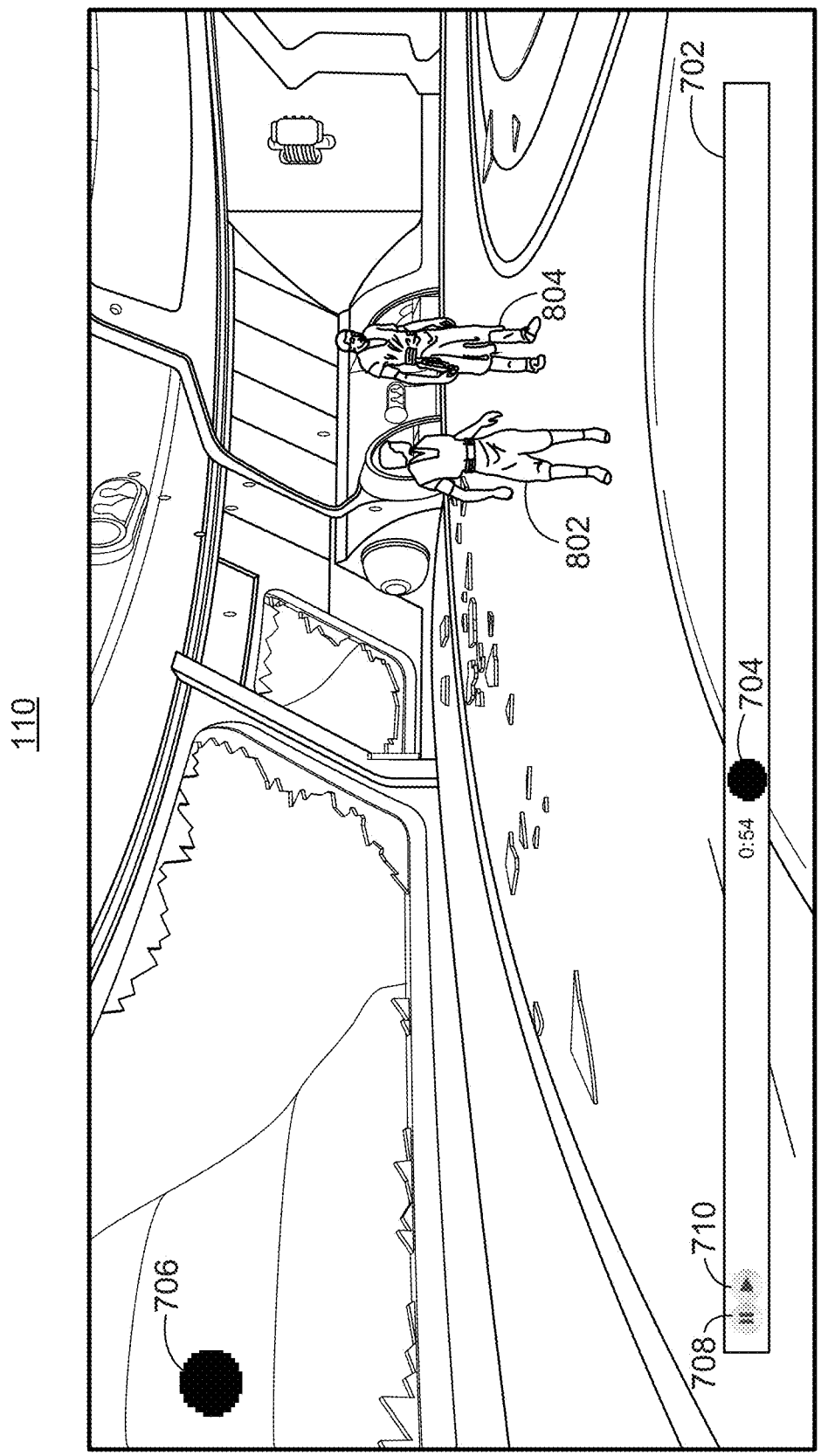
FIG. 8 illustrates another example of a media content item presented in an interactive mode.

FIG. 8 shows an example of a media content item 110 presented in an interactive mode with a modified virtual camera perspective from the perspective of the virtual character 602. For example, the viewer, while watching the scene shown in FIG. 7, may attach the virtual camera to the character 602 using any of the techniques described above for attaching the virtual camera to a virtual object. The computing device 102 may send a signal corresponding to selection of the object to the server 108. The server 108 may then render the image of the media content item 110 shown in FIG. 8 with the virtual camera perspective being from a first person point of view of the character 602. The resulting image includes a view of the character 602 looking at the characters 802 and 804.

In another example, upon reaching a scene of the media content item 110, the viewer may select an asset (e.g., a virtual character, a virtual object, or other asset of the media content item) currently being displayed. The scene may present a robot from an overhead perspective. The viewer may interact with the computing device 102 to select the robot (e.g., using gestures, physically moving the computing device 102, or other interaction). Responsive to the selection, the computing device 102 may send the input (e.g., navigation command, gesture input, sensor input, or the like) to the server 108, and the server 108 may render and present subsequent images of the media content item 110 from a first person viewpoint of the robot.

In embodiments in which the media content item 110 is paused, the viewer may attach the virtual camera to a virtual object when the media content item 110 is paused. When the content is later un-paused, the virtual camera may follow the selected virtual object. The viewer may also attach the virtual camera to a virtual object as the media content item 110 progresses along the timeline in interactive mode. In one example, the media content item 110 may present, in the foreground, a scene where a first protagonist escapes a prison. The media content item 110 may also present, in the background, a starship battle that is occurring as the protagonist escapes the prison. The viewer may pause the media content item 110 using the computing device 102, and may select a starship from the battle occurring in the background. The server 108 may then present an "in movie" game that enables the viewer to control the selected starship and battle other starships. After completion of the game (or at the viewer's discretion), the game may be exited and the starship battle returned to the background. The viewpoint of the protagonist may be returned to the foreground, and the media content item 110 may continue. In some instances, the outcome of an in movie game may influence the remaining portion of the media content item 110.

The viewer may detach the virtual camera from a virtual object by either moving the virtual camera a threshold distance away from the virtual object, selecting another virtual object located in the virtual environment, or otherwise indicating that the virtual camera should be detached from the currently selected virtual object. For example, the viewer may input a pinching gesture input into an interface of the computing device 102 to move the virtual camera away from the selected virtual object to a desired location. The server 108 may, in response, render new or updated images of the media content item 110 with the virtual camera perspective being from the desired location.

In some instances, the viewer may be permitted to change certain characteristics of the virtual scene of the media content item 110, such as environmental attributes or certain clothing attributes of characters. Such changeable characteristics may be limited to a predefined set of attributes. For example, the viewer may be permitted to change cloths of a particular character, but may not be permitted to change other features of the character. In some examples, the media content item 110 may be tailored to provide personalized serial content based on personalization information received from the computing device 102. For example, a viewer may use the computing device 102 to indicate to the server 108 that the viewer has an affinity for a particular comic book character. In one example, a viewer may provide personalization information using a user interface on the computing device 102. Such information may then be sent to the server 108. In one aspect, personalized serial content for the user may be distributed to one or more other authorized users selected by the user. The other authorized users may be selected from a user profile associated with the user over a social network.

In some embodiments, the server 108 may load an asset (e.g., a character, an animal, an object, or other asset) into the media content item 108 that is controllable by a user. As an example, a viewer may have a three dimensional hologram of a mouse interact with an environment that includes other generated holographic characters (e.g., a cat). A viewer may control a character in any suitable manner. In examples using the immersive system 500, the sensors located in or surrounding the area 504 may track the movement of the user. Based on the movement identified by the server 108 using the sensor information, the server 108 may cause a hologram of a character controlled by the user to move in a similar manner. In other examples, the viewer may perform gestures on the computing device 102, or may physically move the computing device 102, to cause the hologram of the character to be moved. Such movement of the hologram of the character may be presented to the user in real or substantial real-time on a display device. In one aspect, the server 108 may process the movements to determine whether the hologram of the character has interacted with other assets or objects of the media content item 110. Based on such a determination, the server 108 may cause modifications to the other assets and/or objects. For example, the viewer may cause the hologram of the character to swing a bat at a hologram of a baseball. Responsive to the swing, the server 108 may alter the trajectory of the baseball hologram that is displayed. In some instances using the immersive system 500, the user-controlled character may interact with other users who are within the area 504 surrounded by the display devices 506, 508, 510, 512, 514. In one aspect, a user controlling a character may be outside of the area 504 surrounded by the display devices 506, 508, 510, 512, 514 in a second different area. One or more sensors of the system 500 may be directed at the second different area in order to capture the movement of the user.

In some embodiments, a viewer may use a camera or other sensing device to generate a virtual representative of a real-world object. For example, the viewer may use a camera of the computing device 102 (or an external camera) to capture images of a real-world object from multiple angles. The images may be sent to the server 108, which may generate a virtual representative of the object. The virtual representative may then be inserted into the media content item 110 by the server 108. Thereafter, the viewer may interact with the virtual representative of the real-world object in the images presented by the item of media content.

In the event the media content item 108 is paused (e.g., automatically upon switching to the interactive mode or in response to a pause command issued by the viewer selecting pause icon 708), the viewer may later unpause or continue progression of the media content item over the timeline. For example, the viewer may select a play icon 710, as shown in FIG. 7-FIG. 8. The media content item 110 then proceeds over the timeline from the current position of the virtual camera (or follows an object if attached) with any changes made to characteristics of the virtual scene. The media content item 110 is continued to be presented in the format and resolution for the interactive mode. The viewer may continue to move the virtual camera to view the content from different perspectives while the media content item 110 progresses. The viewer may further access the list of discovered story threads and/or the scene map to switch between different story threads and their respective predefined virtual camera orientations or locations. In some embodiments, the viewer may perform other functions with respect to the timeline of the media content item 110, including rewinding or fast forwarding to different portions of the media content item 110.

While the media content item 110 is progressing in the interactive mode, the viewer may elect to return to the cinematic mode. For example, the viewer may provide input to the computing device 102 causing the media content item 110 to be returned to the cinematic mode. The computing device 102 may send a signal to the server 108 indicating that the media content item 110 is to be switched from the interactive mode to the cinematic mode. For example, the computing device 102 may send one or more signals to the server 108 (e.g., the rendering engine 1004 of the server 108, described below) instructing the rendering engine to return to rendering the media content item 110 using the director track. As a result, the server 108 may render images of the media content item 110 with the virtual camera returned to the cinematic perspective, including the location or perspective of the virtual camera just prior to entering the interactive mode. As such, the viewer may once again begin viewing the primary story thread from its associated predefined virtual camera orientations. The media content item 110 may further be presented in the default format and resolution for the cinematic mode and may include any of the minor characteristic changes made by the viewer. In some embodiments, the timeline may progress while in interactive mode, in which case the primary story thread may be shown from the current point in the timeline as opposed to the point at which the timeline was paused.

In order to compensate for the limited computational power of the computing device 102 and, if present, the display device 112 and the head-mounted device 104, the system 100 can be used to remotely render the media content item 110 in the different modes, as previously described. However, as a result of latency in the transmission and processing of the image frames of the media content item 110, the rendered images presented to a viewer may not match the current position of the viewer. For example, in virtual reality systems using the head-mounted device 104, the rendered images may not match the head orientation of the viewer. As a consequence, the viewer may have a poor and buggy virtual reality experience.

Accordingly, systems and techniques may be provided that compensate for the discrepancy in position of the viewer. In some examples, navigation inputs including positioning information (e.g., gesture input, sensor input, head orientation information, or other input) may be sent to the server 108 to control which images of the media content item 110 are rendered and from which virtual camera viewing perspective the images are rendered. The navigation inputs and positioning information may be sent by the computing device 102 or by the head-mounted device 104. For example, the computing device 102 may send initial positioning information of the computing device 102 and an associated position indicator to the server. The server 108 may use the initial positioning information to render images of the media content item 110 from the initial position or orientation perspective at which the computing device 102 is oriented. The server 108 may send the rendered images back to the computing device 102 (rendered from the initial position or orientation perspective) with the associated position indicator. The computing device 102 can then check updated positioning information to determine a current position or orientation of the computing device 102, and can use the received associated position indicator, the initial positioning information, and the updated positioning information to modify the rendered image to shift the perspective of the rendered image to that of the updated positioning information. For example, the computing device 102 can use the position indicator to determine the positioning information that corresponds to the initial position or orientation depicted in the rendered images, and can compare the initial positioning information to the updated positioning information. The computing device 102 can modify the image based on the comparison, as described in more detail below.

Figure 9:
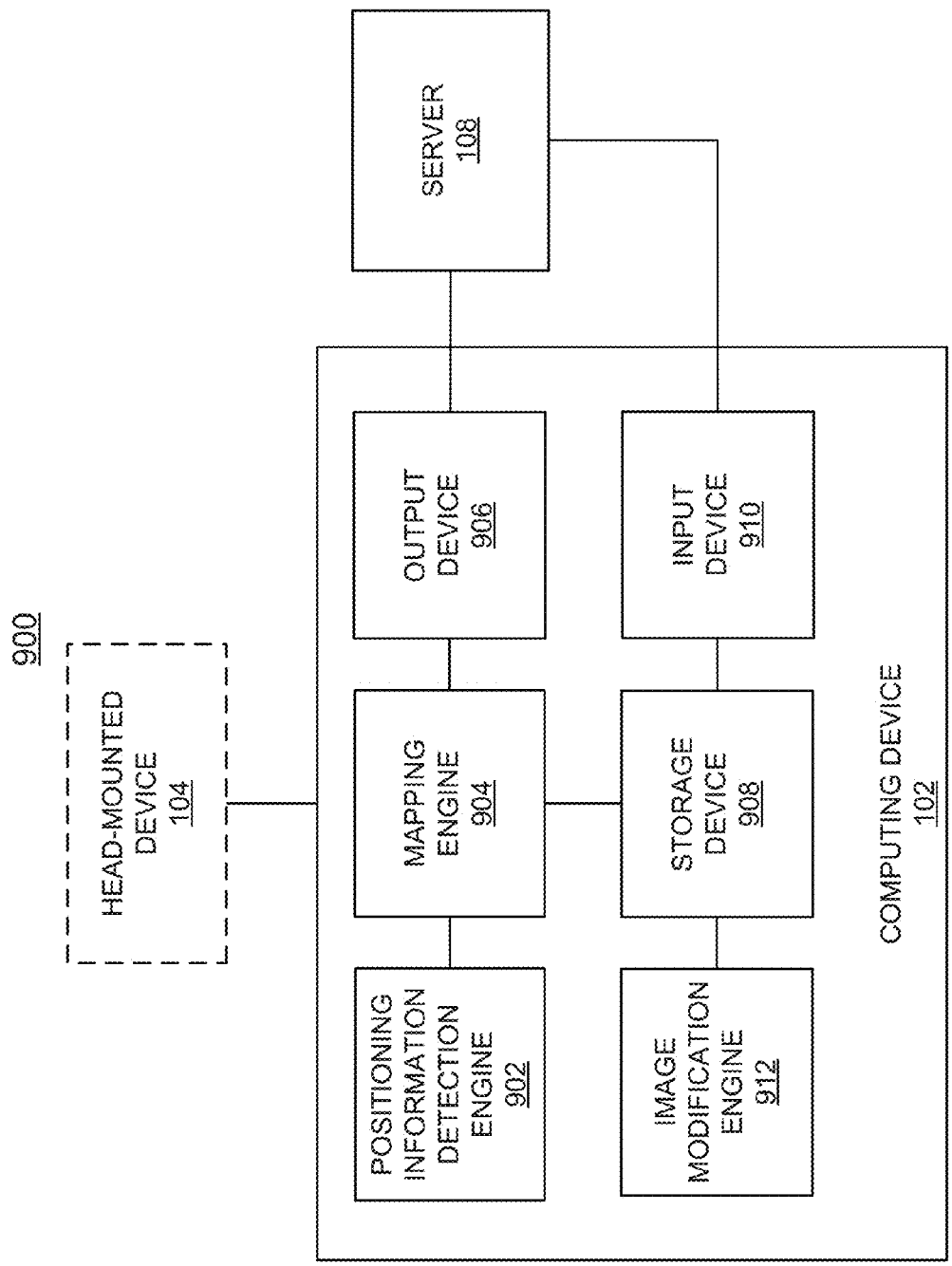
FIG. 9 is a block diagram illustrating an example of a computing device for use in sending information to a server for remotely rendering images of a media content item.

FIG. 9 shows an example of the computing device 102 for use in sending information to the server 108 for remotely rendering images of the media content item 110. In some embodiments, the computing device 102 may be in communication with the head-mounted device 104. For example, the computing device 102 may include a mobile phone that is insertable in the head-mounted device 104. The computing device 102 may receive a navigation input including positioning information from the head-mounted device 104. The positioning information may include a position and/or orientation of the head-mounted device 104 (corresponding to a position and orientation of a user's head). The computing device 102 can process the information and send the processed information to the server 108 for rendering the images of the media content item 110. In other embodiments, the head-mounted device 104 is not used (as indicated by the dotted box around the head-mounted device 104 in FIG. 9), in which case the computing device 102 performs all of the techniques described herein. For example, the computing device 102 can generate navigation inputs including positioning information corresponding to a position and/or orientation of the computing device 102. In such an example, the computing device 102 can process the information and send the processed information to the server 108 for rendering the images of the media content item 110. In yet other embodiments, the components 902, 904, 906, 908, 910, and 912 of the computing device 102 may be contained in the head-mounted device 104, in which case the head-mounted device 104 performs all of the techniques described herein.

The computing device 102 includes a positioning information detection engine 902 that can detect positioning information. In one example, the positioning information can be received from the head-mounted device 104. The head-mounted device 104 may include a virtual reality system with one or more sensors. In this example, the detected positioning information includes a position and/or orientation of the head-mounted device 104, which corresponds to the position and/or orientation of the viewer's head at a given point in time while watching the media content item 110. In some examples, the head-mounted device 104 includes an accelerometer, a magnetometer, and a gyroscope that are used to determine the position and orientation of the head-mounted device 104 in the physical environment. The positioning information may include a set of rotations around three axes (e.g., the x, y, an z axes shown in FIG. 4) in a coordinate system (e.g., a right-handed or left-handed coordinate system), which may indicate an amount of yaw (around the y axis), an amount of pitch (around the x axis), and an amount of roll (around the z axis). For example, the gyroscope may provide a rate of rotation or angular velocity around each of the axes in radians per second. The head-mounted device 104 may periodically or continuously measure angular velocities over time, and may stream the measurements to the position information detection engine 902. The gyroscope may provide an orientation relative to a starting point, but may not provide the original orientation of the head-mounted device 104. Further, the gyroscope may be subject to drift over time, in which case the head-mounted device 104 may be physically aligned in one orientation, but the virtual orientation is aligned in a slightly different orientation. The accelerometer may be used to estimate a gravity vector, and the magnetometer can be used to measure strength and direction of the magnetic field. The sensor information from the accelerometer and the magnetometer can be combined to correct for any drift in one or more of the axes of rotation using known techniques. The resulting positioning information may be provided to the positioning information detection engine 902.

In another example, the positioning information can be generated by the computing device 102 itself. In such an example, the accelerometer, magnetometer, and gyroscope sensors may be contained on the computing device 102, in which case the positioning information detection engine 902 may determine the positioning information of the viewer using sensor input information from the sensors similarly as that described above.

The computing device 102 may store a set of position indicators in the storage device 908. The position indicator may include a color, a time stamp, a shape or other indicator that can be associated with particular positioning information. In one example, the computing device 102 can determine a time at which a particular set of positioning information (e.g., an x, y, z position and/or orientation) is detected. The mapping engine 904 may map or associate the positioning information with a time stamp corresponding to the time. In another example, the mapping engine 904 may select a color, a shape, or other reference object to associate with a given set of positioning information. The mapping engine 904 may then store the positioning information associated with the time stamp, color, shape, or the like in the storage device 908. For example, the storage device 908 may include a table (e.g., an XML file or other file structure) including numerous sets of positioning information, with each set of positioning information being mapped to an associated position indicator (referred to as positioning information-position indicator pairs). In some embodiments, the computing device 102 may store a last x number of positioning information-position indicator pairs in the storage device 908, such as the last five, ten, fifteen, or any other appropriate number of positioning information-position indicator pairs.

In one example, a positioning information-position indicator pair may include initial positioning information corresponding to a position and/or orientation of the computing device 102 or head-mounted device 104 at a given point in time, along with an associated position indicator. The output device 906 may transmit to the server 108 a signal including the initial positioning information and the associated position indicator. The output device 906 may include any suitable transmitter or transceiver that is configured to transmit wireless or wired communications signals.

Figure 10:
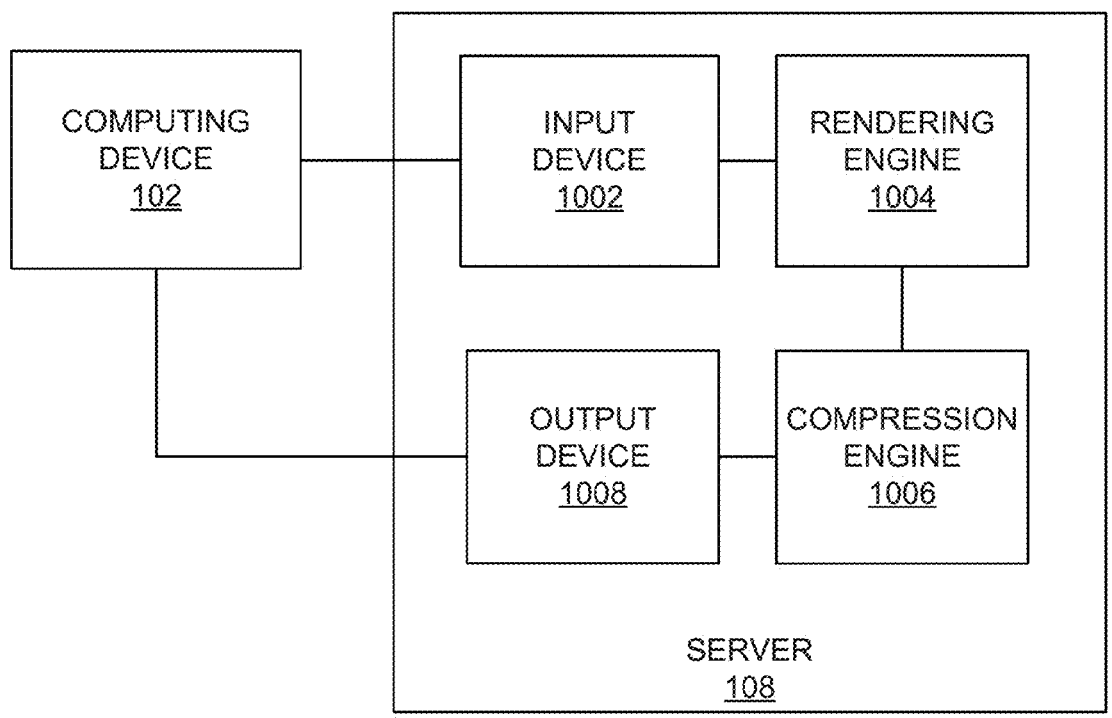
FIG. 10 is a block diagram illustrating an example of a server for remotely rendering images of a media content item.

FIG. 10 shows an example of the server 108. The server 108 receives the signal including the initial positioning information and the associated position indicator using the input device 1002. The input device 1002 may include any suitable receiver or transceiver that is configured to receive wireless or wired communications signals. The input device 1002 may provide the initial positioning information and the associated position indicator to the rendering engine 1004. Using the received initial positioning information, the rendering engine 1004 can render one or more images (or image frames) with a perspective of a virtual camera within a virtual environment of the media content item 110 that corresponds to the initial positioning information. For example, the positioning information may indicate that the computing device 102 or the head-mounted device 104 is physically oriented at a particular amount of yaw (around the y axis), pitch (around the x axis), and roll (around the z axis). The rendering engine 1004 may render the one or more images with the virtual camera adjusted to a corresponding yaw, pitch, and roll in the virtual environment. The server 108 may include hardware and software implementing a rendering algorithm for rendering the one or more images. The rendering algorithm may utilize the positioning information along with one or more scene files that contain objects in a defined language or data structure. Any suitable rendering algorithm may be used to process the positioning information and the scene file to render the images. A rendering algorithm may use one or more of rasterization techniques, ray casting techniques, ray tracing techniques, radiosity techniques, or other suitable techniques for rendering an image. In one example, the rendering algorithm used by the rendering engine 1004 may utilize rasterization with deferred shading and dynamic global illumination. In some embodiments, the rendering engine 1004 may include a graphics processing unit that can be used in addition to a central processing unit for rendering the images.

In some embodiments, the rendering engine 1004 may render the one or more images with the position indicator rendered with the image. For example, in the event the position indicator includes a color or shape, the rendering engine 1004 may insert the shape or color in a corner (or other location) of an image. By inserting the shape or color in the image, the computing device 102 can refer to the color or shape to determine the positioning information that corresponds to the position indicator. In some examples, the one or more images may be rendered with the position indicator by transmitting an n×n (e.g., 8×8 or other appropriate size) pixel region in a corner of an image. In some cases, the corner may be invisible when the image is viewed through the display screen due to distortion of the display device (e.g., the computing device, head-mounted device, or other display device). The position indicator may be rendered in the invisible corner of the image so that it is not viewable by a viewer of the media content item 110. In one example, the n×n region may be an 8×8 pixel region that has one of sixteen shades of gray that can be used by the computing device 102 to determine the position indicator. While there may theoretically be 256 shades of gray possible for an 8×8 region, sixteen shades of gray may be used along with the shrunken 4×4 test region to be more error tolerant in cases in which the video compression or transmission degrades the signal. In other embodiments, the position indicator may include a time stamp. In such embodiments, the server 108 (e.g., the output device 1008 or other component not shown in FIG. 10) may provide the time stamp along with the rendered images to the computing device 102.

The rendering engine 1004 may send the rendered images to the compression engine 1006. The compression engine 1006 applies a compression or coding technique to compress the images to a suitable format for transmission back to the computing device 102. For example, one or more coding techniques may be implemented by the compression engine, including moving picture experts group (MPEG) encoding, advanced video coding (AVC), high efficiency video coding (HEVC), any extensions thereof, or a combination of the different coding standards. The output device 1008 may then transmit the compressed rendered images to the computing device 102. The output device 1008 may include any suitable transmitter or transceiver that is configured to transmit wireless or wired communications signals. In some embodiments, the rendered images may be sent to the computing device 102 without being compressed. The position indicator is sent with the rendered images to the computing device 102, either included in the images themselves or in addition to the images (as described above).

Returning to FIG. 9, the input device 910 receives the one or more rendered images and the position indicator from the server 108. The input device 910 may include any suitable receiver or transceiver that is configured to receive wireless or wired communications signals. In embodiments in which the rendered images are compressed, the computing device 102 may include any suitable decoding device that can decompress the images (e.g., an MPEG decoder, an AVC decoder, an HEVC decoder, or other suitable decoding device).

The computing device 102 may identify the position indicator in the received rendered images (in embodiments in which the position indicator is rendered in the image), or provided along with the received rendered images (in embodiments in which the position indicator is sent along with the rendered images). For example, as described above, the position indicator may be rendered in an image by transmitting an n×n pixel region in a corner of an image (e.g., in an invisible corner of the image). In an example in which the n×n region is an 8×8 pixel region that has one of sixteen shades of gray, the computing device 102 can analyze an inner 4×4 group of pixels of the 8×8 region and can average the pixels. The computing device 102 then rounds to the closest of the sixteen possible gray values to determine which position indicator is in the image.

Once the position indicator is identified, the computing device 102 may access the storage device 908 using the position indicator to retrieve the initial positioning information that corresponds to the position indicator. For example, the computing device 102 (e.g., the image modification engine 912, the mapping engine 904, or other component of the computing device 102 not shown in FIG. 9) may refer to the table of positioning information-position indicator pairs to identify the entry that includes the associated position indicator. The computing device 102 may select the positioning information that corresponds to the associated position indicator. Accordingly, the position indicator allows the computing device 102 to easily determine which position information corresponds to the position or orientation of a virtual camera in a given image.

The computing device 102 may determine updated positioning information that corresponds to a current position or orientation of the computing device 102 or head-mounted device 104. The computing device 102 (e.g., the image modification engine 912) may estimate a change in the received image frame based on the updated positioning information and the initial positioning information. In some examples, a difference between the currently measured orientations and/or positions (the updated positioning information) and the previously transmitted orientations and/or positions (the initial positioning information) can be calculated using vector analysis. For example, a difference between two matrices may be determined by multiplying the inverse of one matrix by another matrix. For example, a first matrix may represent the previously transmitted orientation and/or position, and a second matrix may represent the currently measured orientation and/or position. The inverse of the first matrix can be multiplied by the second matrix to determine the difference between the two matrices, and thus the difference between the initial and updated positioning information. Alternatively, the inverse of the second matrix can be multiplied by the first matrix to determine the difference between the two matrices. A difference matrix can be generated by the computing device 102 representing the difference between the two matrices. In some embodiments when orientation is the only difference, quaternions may be used instead of matrices. In some embodiments, an amount of time that has passed between when the initial positioning information was detected and when the rendered image is received may be taken into account by the image modification engine 912 to determine how much to modify the rendered frame.

The image modification engine 912 can then modify the received rendered images based on the estimated change. The image modification engine 912 may include a graphics processing unit or other processing unit that can modify properties of image frames. In some examples, the image modification engine 912 may construct a modified image frame by shifting or modifying portions of the received image frame to correct for a change or movement in position and/or orientation (e.g., by the computing device 102, head-mounted device 104, or other device indicating a position and/or orientation of the user) that occurred after an image was rendered. In one example, the image modification engine 912 may construct a three-dimensional vector through every pixel (from the 2-D pixel coordinate) of the undistorted source image. The image modification engine 912 may multiply the three-dimensional vector by the difference matrix (described above), and may then transform the three-dimensional vector into a new two-dimensional pixel position in the distorted output image. By shifting portions of the image frame, latency perceived by a viewer of the media content item 110 can be reduced or eliminated. In another example, the image modification engine 912 may construct a modified image frame by combining the received image frame with other previously received image frames that include portions of the virtual scene that are viewable based on the current head orientation. The previously received images may be stored in a cache or buffer storage device. The modified image may then be presented to the viewer for viewing on the computing device 102, the head-mounted device 104, or other display device.

In some instances, an image frame rendered by the rendering engine 1004 of the server 108 may be larger than what is viewable on computing device 102 or head-mounted device 104. For example, the rendering engine 1004 may render such larger images to allow for shifting of the image to compensate for head movement. For example, if the viewer moves the computing device 102 or head-mounted device 104 quickly in a certain direction to arrive at a particular position, the frame that is being viewed may not have enough information for the viewer to view image data at the particular position. As a result, the viewer may be presented with a black region. The same black region may occur if a long period of latency occurs between when the computing device 102 or head-mounted device 104 sends the positioning information and when the rendered images are received. The rendering engine 1004 may render an image a certain amount surrounding the viewer's point of view (e.g., 10 degrees to the left, 10 degrees to the right, 10 degrees above, and 10 degrees below the viewer's point of view). The size of the frame that is rendered may be dynamically changed based on a detected amount of latency between the computing device 102 or head-mounted device 104 and the server 108.

The above-described systems and devices provide content with different modes and interactive options, while compensating for latency issues that arise in certain situations. Various processes will now be described that can utilize the above-described systems and devices.

Figure 11A:
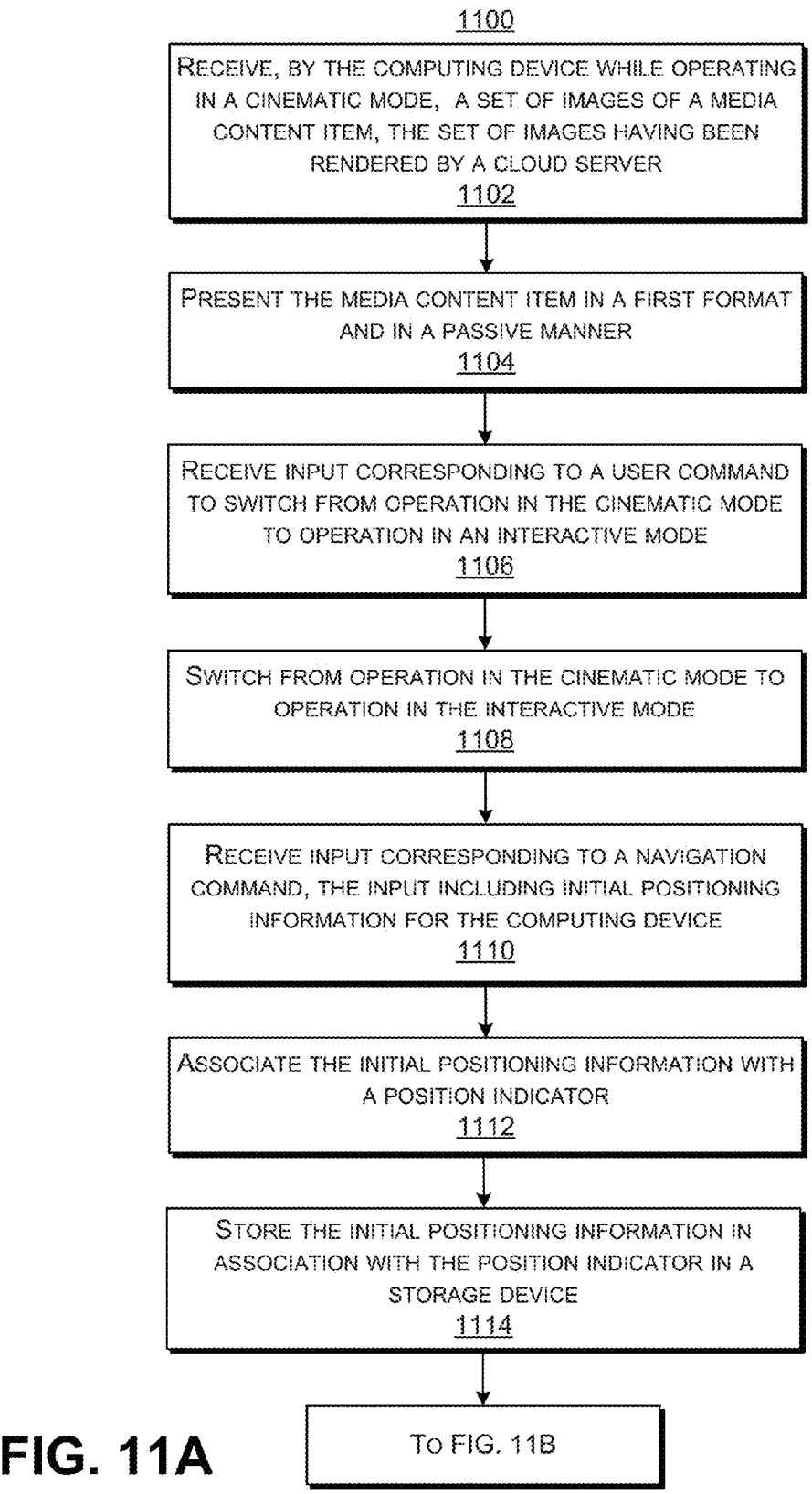
FIG. 11A and FIG. 11B illustrate a flow chart of a process for switching modes associated with a media content item displayed on a computing device.
Figure 11B:
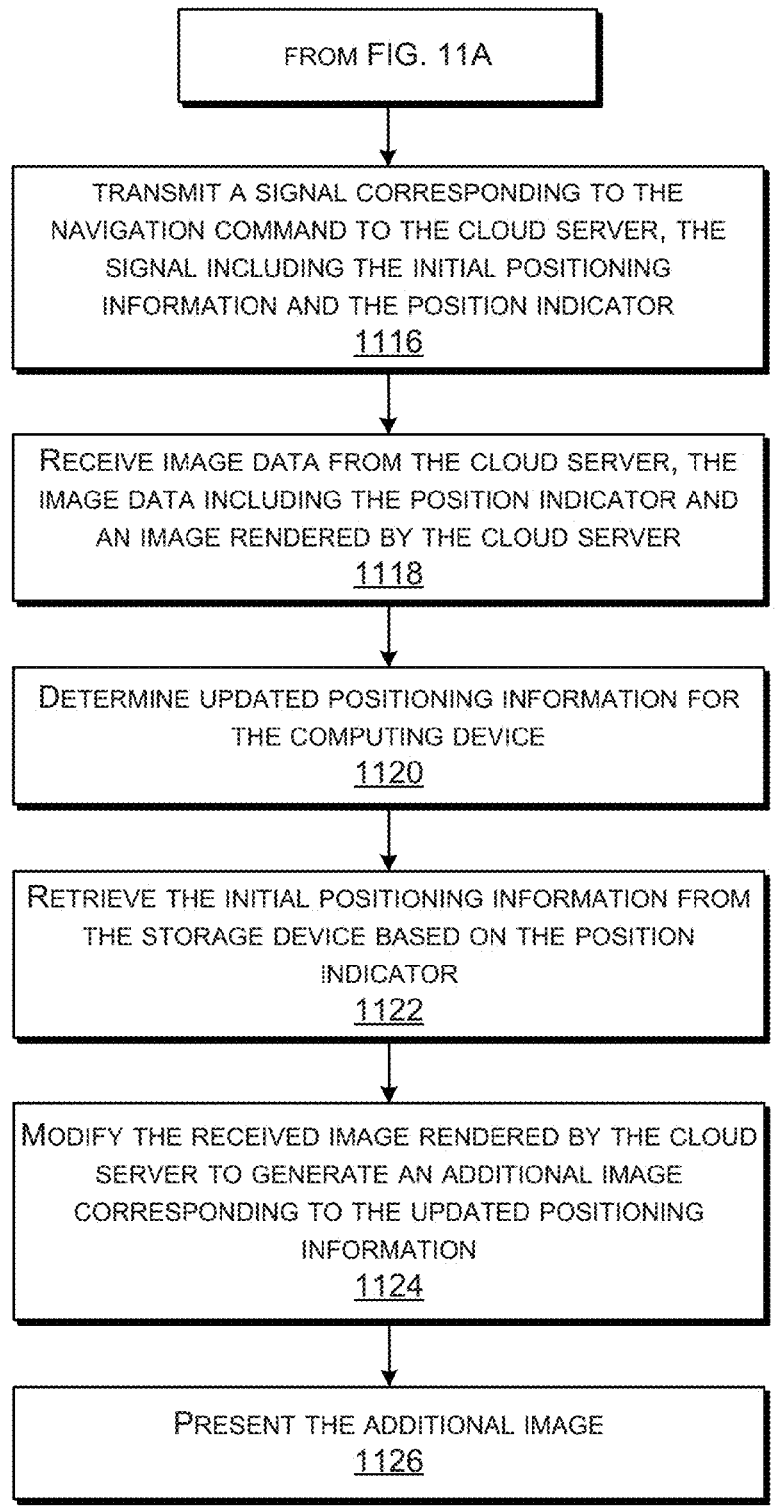

FIG. 11A and FIG. 11B illustrate an example of a process 1100 of switching modes associated with a media content item displayed on a computing device. Process 1100 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some aspects, the process 1100 may be performed by a computing device, such as the computing device 102, the head-mounted device 104, or the display device 112.

At 1102, the process 1100 includes receiving, by the computing device while operating in a cinematic mode, a set of images of the media content item. The received set of images is rendered by a cloud server that is different from the computing device. The media content item is in a cinematic mode when the set of images are received, in which case the received set of images includes a predefined cinematic perspective of a virtual camera within a virtual environment of the media content item.

At 1104, the process 1100 includes presenting, by the computing device while operating in the cinematic mode, the media content item in a first format and in a passive manner in which user control of the virtual camera within the virtual environment of the media content item is not enabled. The first format may include a particular frame rate, resolution, aspect ratio, or other format. The first format may also include one or more letterbox bars.

At 1106, the process 1100 includes receiving, by the computing device, input corresponding to a user command to switch from operation in the cinematic mode to operation in an interactive mode. The input may include a touchscreen input, a keypad input, a gesture input, or any other suitable input command. At 1108, the process 1100 includes switching, by the computing device, from operation in the cinematic mode to operation in the interactive mode in which user control of the virtual camera within the virtual environment of the media content item is enabled and the media content item is presented in a second format different from the first format. The second format may include a different frame rate, resolution, aspect ratio, or other format that is different from the first format. In some embodiments, the first format is the same as the second format, in which case the media content item is presented in the same format in the cinematic and interactive modes. The second format may also include no letterbox bars.

At 1110, the process 1100 includes receiving, by the computing device while operating in the interactive mode, input corresponding to a navigation command for controlling navigation of the virtual camera within the virtual environment. The input includes initial positioning information for the computing device. In some embodiments, the input includes a gesture input. In some embodiments, the input includes sensor information indicating a movement of the computing device.

At 1112, the process 1100 includes associating the initial positioning information with a position indicator. In some embodiments, the position indicator includes a time stamp, a color, a shape, or other indicator that can be associated with particular positioning information. For example, the computing device may store a set of position indicators in a storage device, as described above. At 1114, the process 1100 includes storing the initial positioning information in association with the position indicator in the storage device. For example, the storage device may include a table (e.g., an XML file or other file structure) including numerous sets of positioning information, with each set of positioning information being mapped to an associated position indicator (referred to as positioning information-position indicator pairs). In some embodiments, the computing device may store a last x number of positioning information-position indicator pairs in the storage device, including any appropriate number of positioning information-position indicator pairs.

At 1116, the process 1100 includes transmitting a signal corresponding to the navigation command to the cloud server. The signal includes the initial positioning information and the position indicator. The cloud server may use the initial positioning information to render images with a perspective of a virtual camera within a virtual environment of the media content item that corresponds to the initial positioning information. At 1118, the process 1100 includes receiving image data from the cloud server, the image data including the position indicator and an image rendered by the cloud server corresponding to the initial positioning information.

At 1120, the process 1100 includes determining updated positioning information for the computing device. At 1122, the process 1100 includes retrieving the initial positioning information from the storage device based on the position indicator. In some embodiments, the process 1100 may further include storing, in the storage device, a plurality of sets of positioning information in association with corresponding position indicators. Each set of positioning information is associated with a separate position indicator in the storage device. The process 1100 may further include identifying the position indicator in the received image data. Retrieving the initial positioning information from the storage device based on the position indicator may include identifying a set of positioning information from the plurality of sets that is stored in association with the initial positioning information in the storage device.

At 1124, the process 1100 includes modifying, by the computing device, the received image rendered by the cloud server based on the received position indicator, the retrieved initial positioning information, and the updated positioning information to generate an additional image corresponding to the updated positioning information. For example, the computing device may estimate a change in the received image frame based on the updated positioning information and the initial positioning information using the techniques described above. In some embodiments, the received image is modified to compensate for a difference in positioning information between the initial positioning information and the updated positioning information. For example, the computing device may construct a modified image frame by shifting or modifying portions of the received image frame to correct for a change or movement in position and/or orientation by the computing device or other device (e.g., a head-mounted device, or other device indicating a position and/or orientation of the user) that occurred after an image was rendered.

At 1126, the process 1100 includes presenting, by the computing device while operating in the interactive mode, the additional image corresponding to the updated positioning information.

In some embodiments, the media content item is automatically paused at a first time of a timeline associated with the media content item when the computing device switches from operation in the cinematic mode to operation in the interactive mode. In some embodiments, the interactive mode allows control of a timeline of the media content item.

In some embodiments, the process 1100 includes switching operation of the computing device from the interactive mode to the cinematic mode, wherein the virtual camera returns to the predefined cinematic perspective from a user controlled perspective when the computing device is switched from operation in the interactive mode to operation in the cinematic mode.

In some embodiments, the process 1100 includes receiving input corresponding to selection of a location bookmark. The location bookmark corresponds to a location within the virtual environment. The process 1100 may further include transmitting a signal corresponding to the location bookmark to the cloud server, and receiving at least one image of the media content item from the cloud server. The at least one image includes a perspective of the virtual camera at the location within the virtual environment based on the location bookmark. The process 1100 may further include presenting the at least one image of the media content item.

In some embodiments, the process 1100 includes pausing the media content item when the computing device is switched from operation in the cinematic mode to operation in the interactive mode, receiving input corresponding to selection of an object within the virtual environment, transmitting a signal corresponding to the selection of the object to the cloud server, and receiving at least one image of the media content item from the cloud server. The at least one image includes a perspective of the virtual camera from a point of view of the object. The method 1100 may further include unpausing the media content item to present the at least one image of the media content item. In some embodiments, selection of the object includes moving the virtual camera a threshold distance from the object.

Figure 12A:
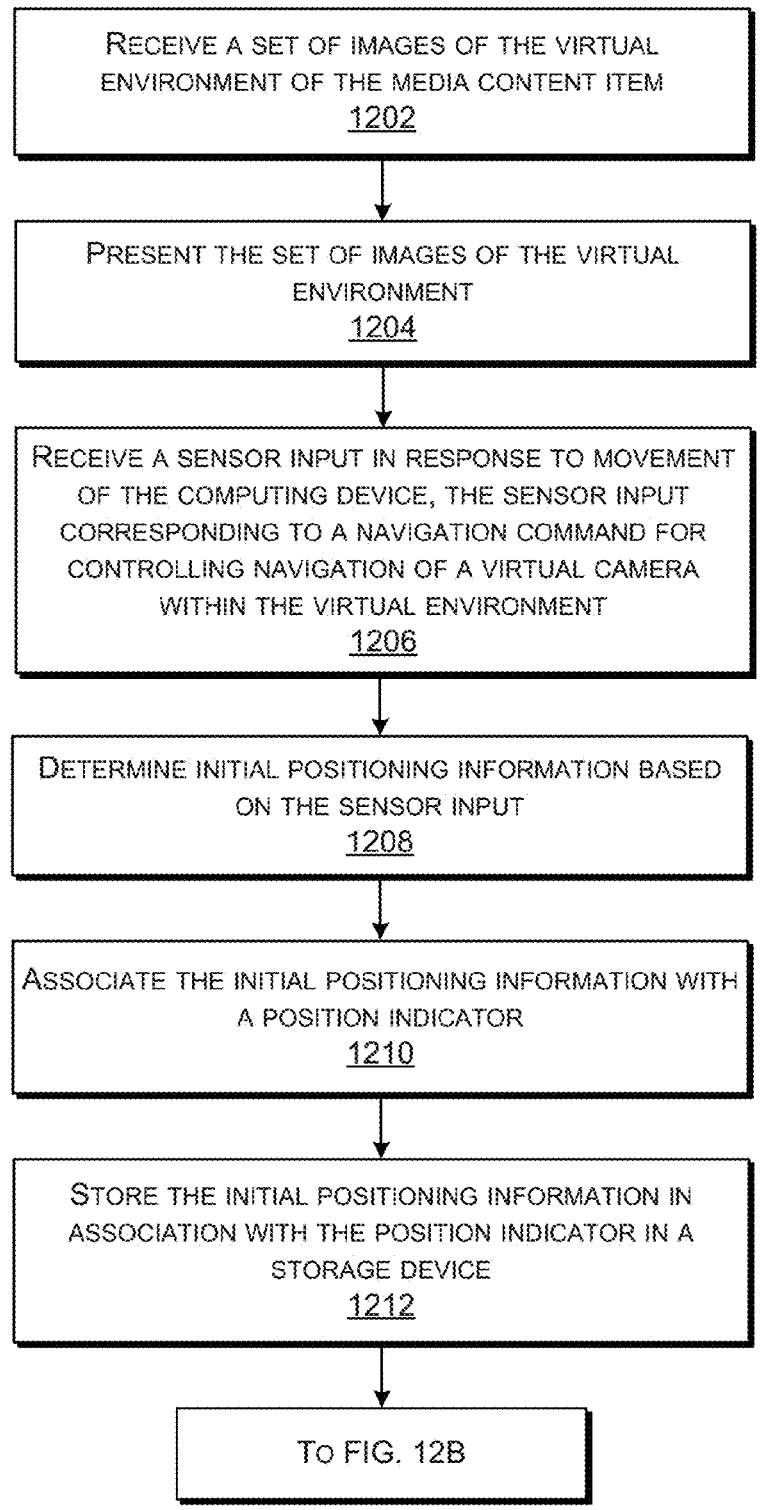
FIG. 12A and FIG. 12B illustrate a flow chart of a process for navigating a virtual environment of a media content item using a computing device.
Figure 12B:
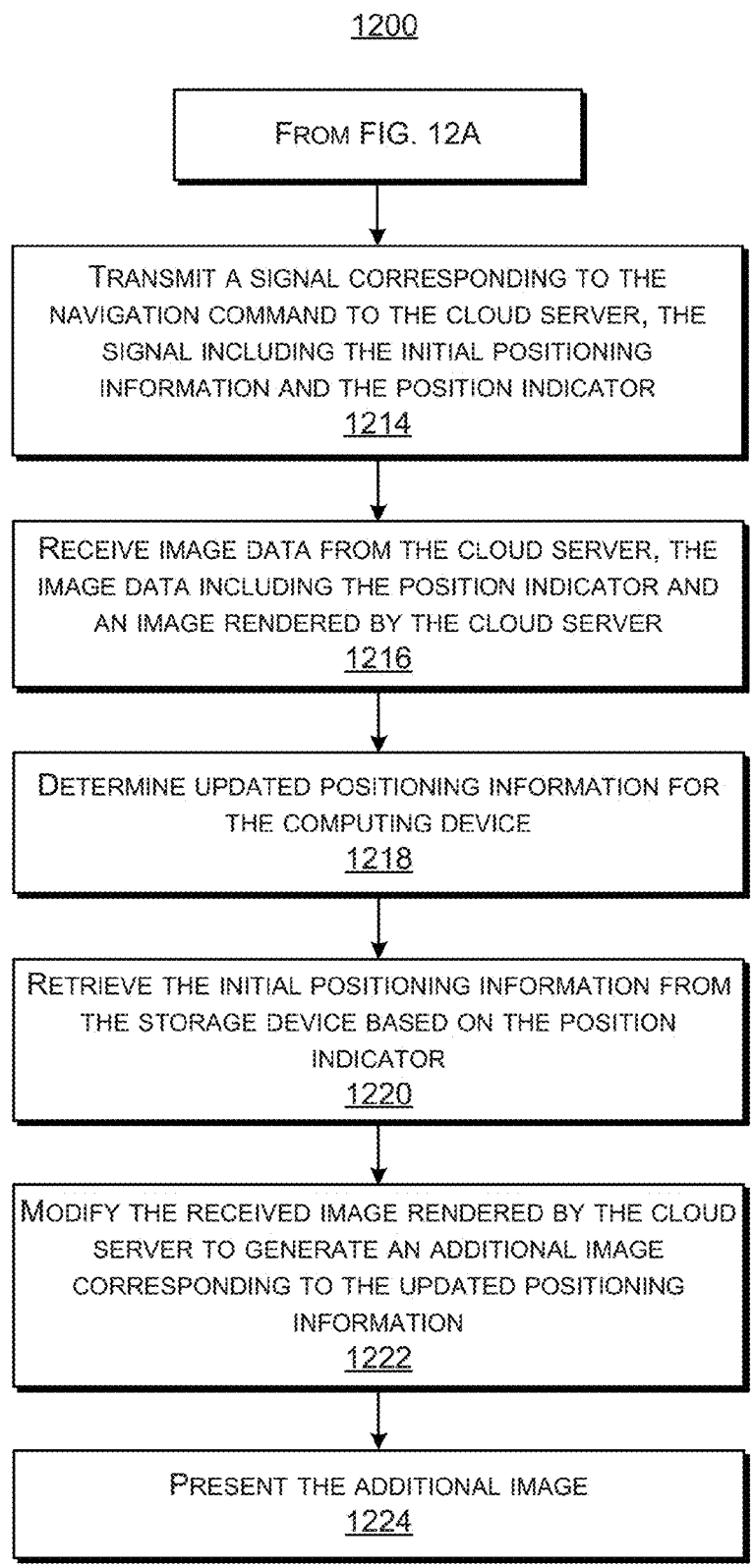

FIG. 12A and FIG. 12B illustrate an example of a process 1200 of navigating a virtual environment of a media content item using a computing device. Process 1200 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

In some aspects, the process 1200 may be performed by a computing device, such as the computing device 102, the head-mounted device 104, or the display device 112.

At 1202, the process 1200 includes receiving, by the computing device, a set of images of the virtual environment of the media content item. The received set of images is rendered by a cloud server that is different from the computing device. At 1204, the process 1200 includes presenting, by the computing device, the set of images of the virtual environment.

At 1206, the process 1200 includes receiving, by the computing device, a sensor input in response to movement of the computing device. The sensor input corresponds to a navigation command for controlling navigation of a virtual camera within the virtual environment. The sensor input is received from at least one of an accelerometer, a gyroscope, a depth sensor, or a global positioning system sensor of the computing device.

At 1208, the process 1200 includes determining initial positioning information based on the sensor input. At 1210, the process 1200 includes associating the initial positioning information with a position indicator. In some embodiments, the position indicator includes a time stamp, a color, a shape, or other indicator that can be associated with particular positioning information. For example, the computing device may store a set of position indicators in a storage device, as described above. At 1212, the process 1200 includes storing the initial positioning information in association with the position indicator in the storage device. For example, the storage device may include a table (e.g., an XML file or other file structure) including numerous sets of positioning information, with each set of positioning information being mapped to an associated position indicator (referred to as positioning information-position indicator pairs). In some embodiments, the computing device may store a last x number of positioning information-position indicator pairs in the storage device, including any appropriate number of positioning information-position indicator pairs.

At 1214, the process 1200 includes transmitting a signal corresponding to the navigation command to the cloud server. The signal includes the initial positioning information and the position indicator. The cloud server may use the initial positioning information to render images with a perspective of a virtual camera within a virtual environment of the media content item that corresponds to the initial positioning information. At 1216, the process 1200 includes receiving image data from the cloud server. The image data includes the position indicator and an image rendered by the cloud server corresponding to the initial positioning information.

At 1218, the process 1200 includes determining updated positioning information for the computing device. At 1220, the process 1200 includes retrieving the initial positioning information from the storage device based on the position indicator. In some embodiments, the process 1200 includes storing, in the storage device, a plurality of sets of positioning information in association with corresponding position indicators. Each set of positioning information being associated with a separate position indicator in the storage device. The process 1200 may further include identifying the position indicator in the received image data. Retrieving the initial positioning information from the storage device based on the position indicator may include identifying a set of positioning information from the plurality of sets that is stored in association with the initial positioning information in the storage device.

At 1222, the process 1200 includes modifying, by the computing device, the received image rendered by the cloud server based on the received position indicator, the retrieved initial positioning information, and the updated positioning information to generate an additional image corresponding to the updated positioning information. For example, the computing device may estimate a change in the received image frame based on the updated positioning information and the initial positioning information using the techniques described above. In some embodiments, the received image is modified to compensate for a difference in positioning information between the initial positioning information and the updated positioning information. For example, the computing device may construct a modified image frame by shifting or modifying portions of the received image frame to correct for a change or movement in position and/or orientation by the computing device or other device (e.g., a head-mounted device, or other device indicating a position and/or orientation of the user) that occurred after an image was rendered.

At 1224, the process 1200 includes presenting, by the computing device, the additional image corresponding to the updated positioning information.

In some embodiments, a position of the virtual camera is mapped to a physical position and orientation of the computing device using the sensor input. For example, the computing device or server may associate or map movement of the computing device in the physical world to movement through the virtual environment of the media content item. A physical position and orientation of the computing device at a first point in time may be treated as an origin. As the simulated movement through the virtual environment continues in time, differences in position and/or orientation between the origin position and orientation at the first point in time and later positions and/or orientations may be used to translate and rotate the virtual camera. In some instances, the computing device or server may perform a direct association between the virtual camera and the current physical position and/or orientation of the computing device. In other instances, the computing device or server may perform an association between the virtual camera and the current physical position and/or orientation of the computing device based on the virtual scene and the physical environment in which the viewer is located.

Using the above-described systems and techniques, viewers of content may be presented with various interactive options, while allowing the content to be rendered remotely to reduce the burden on computing devices used to display and control the content. Furthermore, techniques are provided to allow the remote rendering to compensate for latency.

Figure 13:
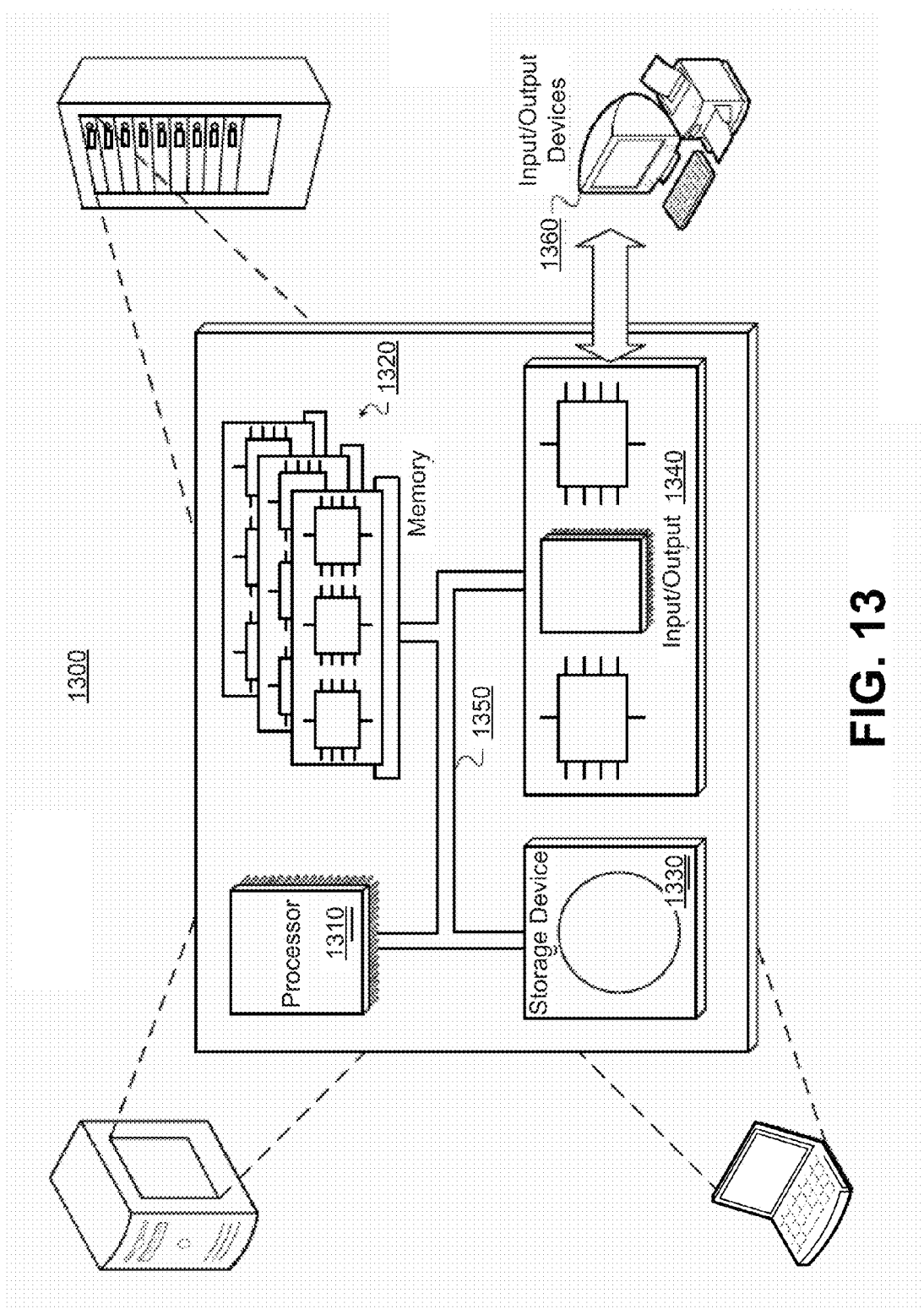
FIG. 13 shows an example of a computer system that may be used in various embodiments of the present invention.

Referring to FIG. 13, a schematic diagram is shown of an example of a computer system 1300. This system is exemplary only and one having skill in the art will recognize that variations and modifications are possible. The system 1300 can be used for the operations described above. For example, the computer systems shown in FIG. 13 may be used to implement any or all of the initialization (e.g., face annotation, skull fitting, constraint creation) and stabilization (e.g., skin energy or error determination, nose energy or error determination) techniques and routines described herein.

The system 1300 includes a processor 1310, a memory 1320, a storage device 1330, and an input/output interface 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to provide graphical information via input/output interface 1340 for display on a user interface of one or more input/output device 1360.

The memory 1320 stores information within the system 1300 and may be associated with various characteristics and implementations. For example, the memory 1320 may include various types of computer-readable medium such as volatile memory, a non-volatile memory and other types of memory technology, individually or in combination.

The storage device 1330 is capable of providing mass storage for the system 1300. In one implementation, the storage device 1330 is a computer-readable medium. In various different implementations, the storage device 1330 may be a floppy disk device, a hard disk device, an optical disk device, or a tape device.

The input/output device 1360 provides input/output operations for the system 1300. In one implementation, the input/output device 1360 includes a keyboard and/or pointing device. In another implementation, the input/output device 1360 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification may be made without departing from the scope of the invention.

What is claimed is:

1. A computer-implemented method of switching modes associated with a media content item presented by a computing device, comprising:

receiving, by the computing device while operating in a cinematic mode, a set of images of the media content item, the set of images having been rendered by a cloud server different from the computing device and including a predefined cinematic perspective of a virtual camera within a virtual environment of the media content item;

presenting, by the computing device while operating in the cinematic mode, the media content item in a first format and in a passive manner in which user control of the virtual camera within the virtual environment of the media content item is not enabled;

receiving, by the computing device, input corresponding to a user command to switch from operation in the cinematic mode to operation in an interactive mode;

switching, by the computing device, from operation in the cinematic mode to operation in the interactive mode in which user control of the virtual camera within the virtual environment of the media content item is enabled and the media content item is presented in a second format different from the first format;

receiving, by the computing device while operating in the interactive mode, input corresponding to a navigation command for controlling navigation of the virtual camera within the virtual environment, wherein the input includes initial positioning information for the computing device;

associating the initial positioning information with a position indicator;

storing the initial positioning information in association with the position indicator in a storage device;

transmitting a signal corresponding to the navigation command to the cloud server, the signal including the initial positioning information and the position indicator;

receiving image data from the cloud server, the image data including the position indicator and an image rendered by the cloud server corresponding to the initial positioning information;

determining updated positioning information for the computing device;

retrieving the initial positioning information from the storage device based on the position indicator;

modifying, by the computing device, the received image rendered by the cloud server based on the received position indicator, the retrieved initial positioning information, and the updated positioning information to generate an additional image corresponding to the updated positioning information; and presenting, by the computing device while operating in the interactive mode, the additional image corresponding to the updated positioning information.

2. The method of claim 1, wherein the position indicator includes a time stamp, a color, or a shape.

3. The method of claim 1, further comprising:
  storing, in the storage device, a plurality of sets of positioning information in association with corresponding position indicators, each set of positioning information being associated with a separate position indicator in the storage device;
  identifying the position indicator in the received image data; and
  wherein retrieving the initial positioning information from the storage device based on the position indicator includes identifying a set of positioning information from the plurality of sets that is stored in association with the initial positioning information in the storage device.

4. The method of claim 1, wherein the received image is modified to compensate for a difference in positioning information between the initial positioning information and the updated positioning information.

5. The method of claim 1, wherein the media content item is automatically paused at a first time of a timeline associated with the media content item when the computing device switches from operation in the cinematic mode to operation in the interactive mode.

6. The method of claim 1, wherein the interactive mode allows control of a timeline of the media content item.

7. The method of claim 1, further comprising switching operation of the computing device from the interactive mode to the cinematic mode, wherein the virtual camera returns to the predefined cinematic perspective from a user controlled perspective when the computing device is switched from operation in the interactive mode to operation in the cinematic mode.

8. The method of claim 1, further comprising:
  receiving input corresponding to selection of a location bookmark, the location bookmark corresponding to a location within the virtual environment;
  transmitting a signal corresponding to the location bookmark to the cloud server;
  receiving at least one image of the media content item from the cloud server, the at least one image including a perspective of the virtual camera at the location within the virtual environment based on the location bookmark; and
  presenting the at least one image of the media content item.

9. The method of claim 1, further comprising:
  pausing the media content item when the computing device is switched from operation in the cinematic mode to operation in the interactive mode;
  receiving input corresponding to selection of an object within the virtual environment;
  transmitting a signal corresponding to the selection of the object to the cloud server;
  receiving at least one image of the media content item from the cloud server, the at least one image including a perspective of the virtual camera from a point of view of the object; and
  unpausing the media content item to present the at least one image of the media content item.

10. The method of claim 9, wherein selection of the object includes moving the virtual camera a threshold distance from the object.

11. A computing device for switching modes associated with a media content item, comprising:
  an input device for receiving, while the computing device is operating in a cinematic mode, a set of images of the media content item, the set of images having been rendered by a cloud server different from the computing device and including a predefined cinematic perspective of a virtual camera within a virtual environment of the media content item;
  one or more processors configurable to present, while the computing device is operating in the cinematic mode, the media content item in a first format and in a passive manner in which user control of the virtual camera within the virtual environment of the media content item is not enabled;
  wherein the input device is configured to receive input corresponding to a user command to switch from operation in the cinematic mode to operation in an interactive mode;
  wherein the one or more processors are configurable to switch from operation in the cinematic mode to operation in the interactive mode in which user control of the virtual camera within the virtual environment of the media content item is enabled and the media content item is presented in a second format different from the first format;
  wherein the input device is configured to receive, while the computing device is operating in the interactive mode, input corresponding to a navigation command for controlling navigation of the virtual camera within the virtual environment, wherein the input includes initial positioning information for the computing device;
  wherein the one or more processors are configurable to:
    associate the initial positioning information with a position indicator; and
    store the initial positioning information in association with the position indicator in a storage device;
  an output device for transmitting a signal corresponding to the navigation command to the cloud server, the signal including the initial positioning information and the position indicator;
  wherein the input device is configured to receive image data from the cloud server, the image data including the position indicator and an image rendered by the cloud server corresponding to the initial positioning information; and
  wherein the one or more processors are configurable to:
    determine updated positioning information for the computing device;
    retrieve the initial positioning information from the storage device based on the position indicator;
    modify the received image rendered by the cloud server based on the received position indicator, the retrieved initial positioning information, and the updated positioning information to generate an additional image corresponding to the updated positioning information; and
    present, while the computing device is operating in the interactive mode, the additional image corresponding to the updated positioning information.

12. The computing device of claim 11, wherein the one or more processors are configurable to:
  store, in the storage device, a plurality of sets of positioning information in association with corresponding position indicators, each set of positioning information being associated with a separate position indicator in the storage device;
  identify the position indicator in the received image data; and
  retrieve the initial positioning information from the storage device based on the position indicator by identifying a set of positioning information from the plurality of sets that is stored in association with the initial positioning information in the storage device.

13. The computing device of claim 11, wherein the received image is modified to compensate for a difference in positioning information between the initial positioning information and the updated positioning information.

14. The computing device of claim 11, wherein the one or more processors are configurable to switch operation of the computing device from the interactive mode to the cinematic mode, wherein the virtual camera returns to the predefined cinematic perspective from a user controlled perspective when the computing device is switched from operation in the interactive mode to operation in the cinematic mode.

15. The computing device of claim 11, wherein:
the one or more processors are configurable to pause the media content item when the computing device is switched from operation in the cinematic mode to operation in the interactive mode;
the input device is configured to receive input corresponding to selection of an object within the virtual environment;
the output device is configured to transmit a signal corresponding to the selection of the object to the cloud server;
the input device is configured to receive at least one image of the media content item from the cloud server, the at least one image including a perspective of the virtual camera from a point of view of the object; and
the one or more processors are configurable to unpause the media content item to present the at least one image of the media content item.

16. A computer-readable memory storing a plurality of instructions executable by one or more processors of a computing device, the plurality of instructions comprising:
instructions that cause the one or more processors to receive, while the computing device is operating in a cinematic mode, a set of images of the media content item, the set of images having been rendered by a cloud server different from the computing device and including a predefined cinematic perspective of a virtual camera within a virtual environment of the media content item;
instructions that cause the one or more processors to present, while the computing device is operating in the cinematic mode, the media content item in a first format and in a passive manner in which user control of the virtual camera within the virtual environment of the media content item is not enabled;
instructions that cause the one or more processors to receive input corresponding to a user command to switch from operation in the cinematic mode to operation in an interactive mode;
instructions that cause the one or more processors to switch from operation in the cinematic mode to operation in the interactive mode in which user control of the virtual camera within the virtual environment of the media content item is enabled and the media content item is presented in a second format different from the first format;
instructions that cause the one or more processors to receive, while the computing device is operating in the interactive mode, input corresponding to a navigation command for controlling navigation of the virtual camera within the virtual environment, wherein the input includes initial positioning information for the computing device;
instructions that cause the one or more processors to associate the initial positioning information with a position indicator;
instructions that cause the one or more processors to store the initial positioning information in association with the position indicator in a storage device;
instructions that cause the one or more processors to transmit a signal corresponding to the navigation command to the cloud server, the signal including the initial positioning information and the position indicator;
instructions that cause the one or more processors to receive image data from the cloud server, the image data including the position indicator and an image rendered by the cloud server corresponding to the initial positioning information;
instructions that cause the one or more processors to determine updated positioning information for the computing device;
instructions that cause the one or more processors to retrieve the initial positioning information from the storage device based on the position indicator;
instructions that cause the one or more processors to modify the received image rendered by the cloud server based on the received position indicator, the retrieved initial positioning information, and the updated positioning information to generate an additional image corresponding to the updated positioning information; and
instructions that cause the one or more processors to present, while the computing device is operating in the interactive mode, the additional image corresponding to the updated positioning information.

17. The computer-readable memory of claim 16, further comprising:
instructions that cause the one or more processors to store, in the storage device, a plurality of sets of positioning information in association with corresponding position indicators, each set of positioning information being associated with a separate position indicator in the storage device;
instructions that cause the one or more processors to identify the position indicator in the received image data; and
wherein retrieving the initial positioning information from the storage device based on the position indicator includes identifying a set of positioning information from the plurality of sets that is stored in association with the initial positioning information in the storage device.

18. The computer-readable memory of claim 16, wherein the received image is modified to compensate for a difference in positioning information between the initial positioning information and the updated positioning information.

19. The computer-readable memory of claim 16, further comprising instructions that cause the one or more processors to switch operation of the computing device from the interactive mode to the cinematic mode, wherein the virtual camera returns to the predefined cinematic perspective from a user controlled perspective when the computing device is switched from operation in the interactive mode to operation in the cinematic mode.

20. The computer-readable memory of claim 16, further comprising:
instructions that cause the one or more processors to pause the media content item when the computing device is switched from operation in the cinematic mode to operation in the interactive mode;
instructions that cause the one or more processors to receive input corresponding to selection of an object within the virtual environment;

instructions that cause the one or more processors to transmit a signal corresponding to the selection of the object to the cloud server;

instructions that cause the one or more processors to receive at least one image of the media content item from the cloud server, the at least one image including a perspective of the virtual camera from a point of view of the object; and instructions that cause the one or more processors to unpause the media content item to present the at least one image of the media content item.

* * * * *